(12) United States Patent
Kwok et al.

(10) Patent No.: US 12,008,586 B2
(45) Date of Patent: Jun. 11, 2024

(54) SYSTEMS FOR PREDICTING ACTIVITY DISTRIBUTION ACROSS MEDIUMS AND METHODS THEREOF

(71) Applicant: Capital One Services, LLC, McLean, VA (US)

(72) Inventors: Jennifer Kwok, New Rochelle, NY (US); Abdelkader M'hamed Benkreira, Ny, NY (US); Viraj Chaudhary, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 296 days.

(21) Appl. No.: 17/089,524

(22) Filed: Nov. 4, 2020

(65) Prior Publication Data

US 2022/0138774 A1    May 5, 2022

(51) Int. Cl.
G06Q 30/0201    (2023.01)
G06N 20/00    (2019.01)

(52) U.S. Cl.
CPC ......... *G06Q 30/0201* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 8,626,579 B2 | 1/2014 | Fordyce, III et al. | |
| 2014/0358633 A1 | 12/2014 | Wu et al. | |
| 2015/0317653 A1* | 11/2015 | Ettl | G06Q 30/0202 705/7.31 |
| 2020/0005087 A1* | 1/2020 | Sewak | G06N 3/08 |
| 2021/0166251 A1* | 6/2021 | Mehmanpazir | G06N 20/20 |

OTHER PUBLICATIONS

Huang et al. "An Empirical Study of the Cross-Channel Effects Between Web and Mobile Shopping Channels." Information & Management 53 (2016) 265-278. (Year: 2016).*

(Continued)

*Primary Examiner* — Susanna M. Diaz
(74) *Attorney, Agent, or Firm* — Greenberg Traurig, LLP

(57) ABSTRACT

Systems and methods of the present disclosure enable the prediction of activity distribution across mediums of activities by employing processors that receive an activity record history across channels of mediums of activity. A candidate activity channel profile of a future activity channel is received that includes candidate channel attributes including: a medium attribute identifying the medium, and an activity category attribute identifying a category of activities of the future activity channel. Cannibalization forecasting models are used to predict channel metrics based on the candidate channel attributes and model parameters trained on the activity record history. New candidate channel attributes are automatically generated that improve the at least one channel metric based on the at least one channel metric, and a new candidate activity channel profile is automatically modified using the new candidate channel attributes. The channel metrics are displayed on computing devices associated with users.

20 Claims, 8 Drawing Sheets

(56) References Cited

OTHER PUBLICATIONS

Avery et al. "Adding Bricks to Clicks: Predicting the Patterns of Cross-Channel Elasticities over Time." Journal of Marketing, Jul. 2011. (Year: 2011).*

Nachane, D.M. "Time-Varying Spectral Analysis: Theory and Applications." Indira Gandhi Institute of Development Research, Mumbai, Dec. 2018. Retrieved from [URL: http://igidr.ac.in/pdf/publication/WP-2018-025.pdf] on May 6, 2023. (Year: 2018).*

Pauwels et al., "Building with Bricks and Mortar: The Revenue Impact of Opening Physical Stores in a Multichannel Environment", Dec. 8, 2011.

* cited by examiner

SYSTEMS FOR PREDICTING ACTIVITY DISTRIBUTION ACROSS MEDIUMS AND METHODS THEREOF

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in drawings that form a part of this document: Copyright, Capital One Services, LLC, All Rights Reserved.

FIELD OF TECHNOLOGY

The present disclosure generally relates to computer-based systems configured for activity distribution across mediums, such as distribution across online channels, and methods thereof.

BACKGROUND OF TECHNOLOGY

In many spaces, various user activities can be performed in one of many mediums, such as online medium. Understanding where these activities occur is important for directing physical and virtual resources. However, current solutions fail to provide advanced insight into this distribution of activities.

For example, for many websites, creating an additional presence in a different medium may present a challenge of cannibalization of activity from the online medium. There exists no solution for determining ahead of time the extent of such cannibalization.

SUMMARY OF DESCRIBED SUBJECT MATTER

In some embodiments, the present disclosure provides an exemplary technically improved computer-based method that includes at least the following steps of receiving, by at least one processor, an activity record history across at least one activity channel of at least one medium of activity; where the activity record history is associated with a plurality of entities; receiving, by the at least one processor, a candidate activity channel profile of a future activity channel of a particular entity; where the candidate activity channel profile includes candidate channel attributes including: i) a medium attribute identifying the medium associated with the future activity channel, and ii) an activity category attribute identifying a category of activities associated with the future activity channel; utilizing, by the at least one processor, at least one cannibalization forecasting model to predict an at least one channel metric based on the candidate channel attributes; where the at least one cannibalization forecasting model includes model parameters trained based at least in part on the activity record history; where the activity record history includes training labels including: i) a date label indicative of a time period relative to an origination date of a particular channel of each activity record in the activity record history, and ii) a medium label indicative of the medium of each activity record in the activity record history; automatically generating, by the at least one processor, new candidate channel attributes that improve the at least one channel metric based on the at least one channel metric; automatically modify, by the at least one processor, a new candidate activity channel profile using the new candidate channel attributes; and causing to display, by the at least one processor, the at least one channel metric on a display of at least one computing device associated with at least one user.

In some embodiments, the present disclosure provides another exemplary technically improved computer-based method that includes at least the following steps of receiving, by the at least one processor, a plurality of activity records associated with a plurality of entities; where each activity record of the plurality of activity records include: i) an activity entity identifier associated with an entity of the plurality of entities, ii) a date indicator identifying a date associated with each activity record, iii) an activity location identifier associated with an entity location associated with each activity record, and iv) an activity value; determining, by the at least one processor, first channel activity records of the plurality of activity records based on the activity location identifier of each activity record that identifies a first channel; determining, by the at least one processor, at least one entity associated with the first channel activity records based on the activity entity identifier of each activity record; determining, by the at least one processor, a first channel opening date associated with each first channel based on the date indicator of each retail transaction record; determining, by the at least one processor, the date label for pre-first channel activity records of the plurality of activity records based on: i) the activity location identifier of each activity record associated with the at least one entity that identifies a second channel, and ii) the date indication of each activity record associated with the at least one entity that identifies a pre-first channel opening date occurring before the first channel opening date; determining, by the at least one processor, the date label for post-first channel activity records of the plurality of activity records based on: i) the activity location identifier of each activity record associated with the at least one entity that identifies the second channel, and ii) the date indication of each activity record associated with the at least one entity that identifies a post-first channel opening date occurring on or after the first channel opening date; training, by the at least one processor, at least one cannibalization forecasting model to forecast the at least one channel metric of future activities upon creating a new channel based on the date label and the location label of each activity record of the plurality of activity records; and storing, by the at least one processor, the at least one cannibalization forecasting model for access by at least one user computing device associated with at least one user to forecast the at least one channel metric of the future activities by the new channel based on the activity value and the activity location.

In some embodiments, the present disclosure provides another exemplary technically improved computer-based system that includes at least the following components of at least one processor configured to implement software instructions causing the at least one processor to perform steps to: receive an activity record history across at least one activity channel of at least one medium of activity; where the activity record history is associated with a plurality of entities; receive a candidate activity channel profile of a future activity channel of a particular entity; where the candidate activity channel profile includes candidate channel attributes including: i) a medium attribute identifying the medium associated with the future activity channel, and ii) an activity category attribute identifying a category of activities associated with the future activity channel; utilize at least one cannibalization forecasting model to predict an at least one channel metric based on the candidate channel attributes; where the at least one cannibalization forecasting model includes model parameters trained based at least in part on the activity record history; where the activity record history includes training labels including: i) a date label indicative of a time period relative to an origination date of a particular channel of each activity record in the activity record history, and ii) a medium label indicative of the medium of each activity record in the activity record history; automatically generate new candidate channel attributes that improve the at least one channel metric based on the at least one channel metric; automatically modify a new candidate activity channel profile using the new candidate channel attributes; and cause to display the at least one channel metric on a display of at least one computing device associated with at least one user.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Figure 1:
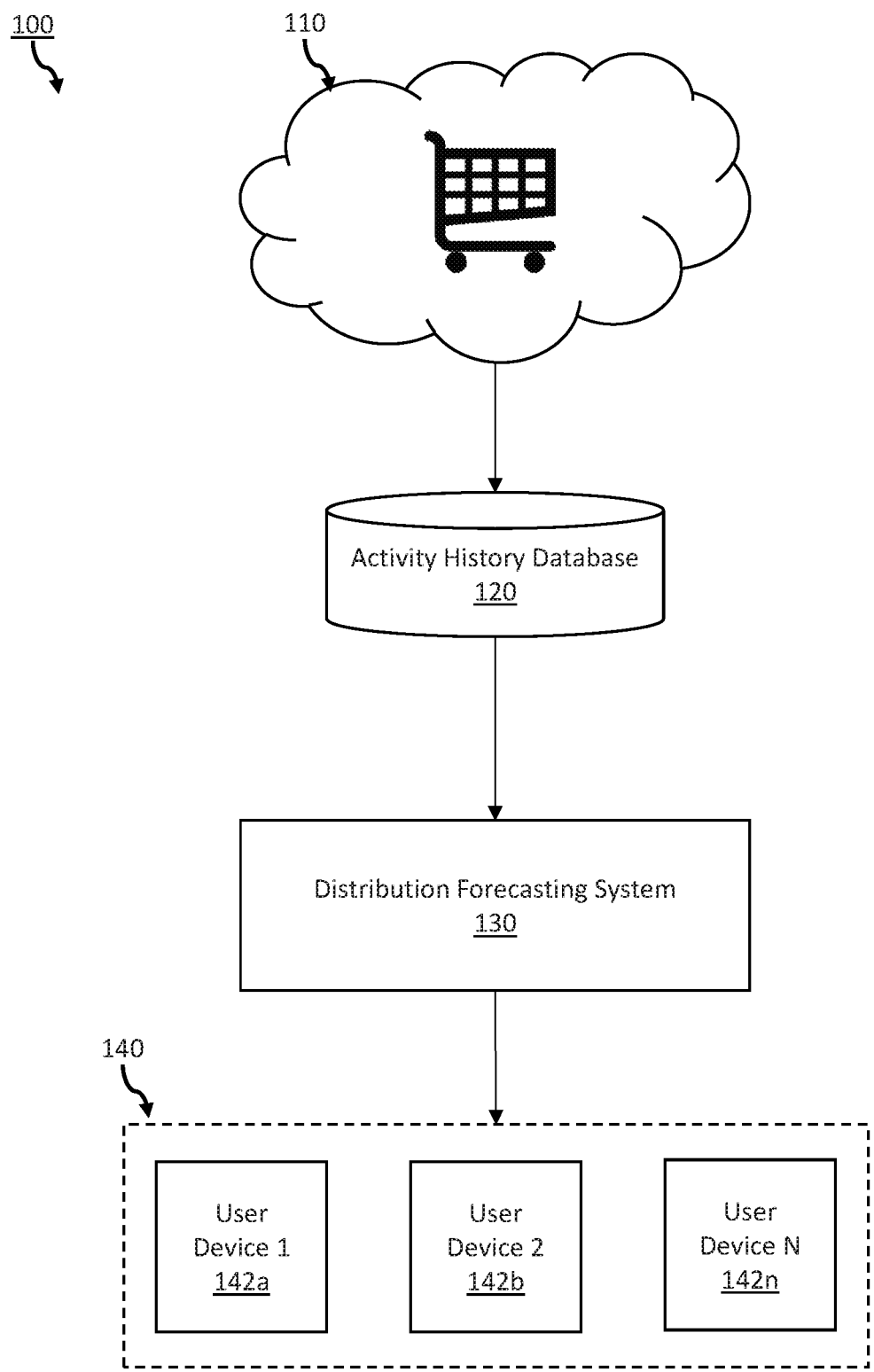
FIGS. 1-8 show one or more schematic flow diagrams, certain computer-based architectures, and/or screenshots of various specialized graphical user interfaces which are illustrative of some exemplary aspects of at least some embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "and" and "or" may be used interchangeably to refer to a set of items in both the conjunctive and disjunctive in order to encompass the full description of combinations and alternatives of the items. By way of example, a set of items may be listed with the disjunctive "or", or with the conjunction "and." In either case, the set is to be interpreted as meaning each of the items singularly as alternatives, as well as any combination of the listed items.

FIGS. 1 through 8 illustrate systems and methods of predicting a distribution of where activities occur across multiple mediums for performing the activities. The following embodiments provide technical solutions and technical improvements that overcome technical problems, drawbacks and/or deficiencies in the technical fields involving of machine learning training and prediction, activity prediction and user interface functionality. As explained in more detail, below, technical solutions and technical improvements herein include aspects of improved data parsing, machine learning model training with the parsed data and user interface tools for viewing and updating model predictions according to activity data. Based on such technical features, further technical benefits become available to users and operators of these systems and methods. Moreover, various practical applications of the disclosed technology are also described, which provide further practical benefits to users and operators that are also new and useful improvements in the art.

For example, using machine learning, historical activity data at entities (e.g., merchants) with an omni-channel presence, and entity data about an open time period of a presence in another medium (e.g., retail store) may be employed to determine the likelihood for user related to the entity (e.g., customers) to perform activities in one channel medium (e.g., online website/store) vs. another channel medium (e.g., physical retail). Historical activity data may include activity data prior to the opening of the other channel media, and after the opening of these additional channel media. The likelihood of the new channel medium or media of cannibalizing the user activities can be used to determine how much activity, and thus resources, may shift from one channel to another, and how much of the activity would be cannibalized versus incremental. In an example involving retail channels, data regarding average order values (AOV) by channel and revenue by channel may quantify user activity. A front-end user interface or user experience may be customized to provide access to the predictions, and to filter results by criteria that most closely matches the entity goals, as well as to input relevant data points, such as planned new channel medium attributes, among other data.

FIG. 1 illustrates a block diagram of an illustrative system and methodology for activity distribution across channels in accordance with one or more embodiments of the present disclosure.

In some embodiments, an activity distribution system 100 may track or analyze activities across a network of activity channels 110. In some embodiments, the activity channels 110 receive or originate activities, including, e.g., activity requests, activity records, activity executions, among other actions pertaining to activities, online and in the physical world. For example, the activity channels 110 can include, e.g., transaction channels (such as online payments, point-of-sale purchases, bank transfers, personal or electronic checks, tap-to-pay, etc.), communication channels (such as telephone, internet, broadband, cellular networks, etc.), media consumption (such as online streaming, cable, etc.), among other channels of various activities.

In some embodiments, each activity collected from the activity channels 110 may include activity details specifying the activity, including, e.g., the channel through which the activity occurred. For example, the activity details may include data fields for, e.g., parties or entities involved in the activity, date of the activity, type of activity, location of the activity, activity status, activity approval status, among other data related each activity. Thus, the activity details can be compared across channels to determine variations according to channel distribution of activities as a function of a selected detail.

For example, in some embodiments, the activities include transactions, such as payments. For transactions, the activity details may include data fields for, e.g., the channel of the transaction as well as, e.g., a payer, a payee, a date, an amount, a purchase volume, among other information. Thus, transactions reported by the network of activity channels 110 can be compared and analyzed across channels to identify trends and variations in transaction details across each channel or each group of channels, such as, e.g., average purchase price, average order volume, number of transactions, total transaction quantity, among other metrics comparing channels and groups of channels for executing transactions.

In some embodiments, the activity channels 110 may execute transaction using transaction channels, by, e.g., requesting and/or authorizing payments, transactions, or both. Accordingly, the network may include any payment device suitable for submitting, e.g., to an account management system or banking system, transaction authorization requests. Such devices may include, e.g., retail payment devices (e.g., point-of-sale terminals), internet payment services, electronic check settlement services, bank transfers, among others across online and physical payment devices and services. In some embodiments, each activity or activity request may be submitted to the account management system or banking system to request that funds be transferred according to the transaction details of the transaction request.

In some embodiments, the transaction requests, authorized transactions, completed transactions, or a combination thereof may be collected by an activity history database 110.

Each payment device may utilize an account number of the payment method being used, such as credit cards or debit cards, to request a transaction from the responsible banking institution associated with the In some embodiments, the network of activity channels 110 collects activities from across the network and stores the activities in an activity history database 110. Thus, the activity history database 120 may maintain a record for each activity, including the associated details, in a suitable storage solution. For example, the activity history database 120 may include, e.g., a suitable memory or storage solutions for receiving electronic data from the network of activity channels 110 and providing electronic data to a distribution forecasting system 130. For example, the storage may include, e.g., a centralized or distributed database, cloud storage platform, decentralized system, server or server system, among other storage systems. Alternatively, or in addition, the storage solution may include, e.g., a hard drive, solid-state drive, flash drive, or other suitable storage device. Alternatively, or in addition, the storage solution may include, e.g., a random-access memory, cache, buffer, or other suitable memory device, or any other data storage solution and combinations thereof.

In some embodiments, the activity history database 120 may provide activity records to the distribution forecasting system 130 in response to, e.g., a suitable application programming interface (API), or requests according to other suitable messaging protocols. In some embodiments, the distribution forecasting system 130 may include components and computer engines for predicting channel distribution metrics related to the distribution of activities across channels on the network 110. As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processing devices, such as, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

In some embodiments, the processing device may include any type of data processing capacity, such as a hardware logic circuit, for example an application specific integrated circuit (ASIC) and a programmable logic, or such as a computing device, for example, a microcomputer or microcontroller that include a programmable microprocessor. In some embodiments, the processing device may include data-processing capacity provided by the microprocessor. In some embodiments, the microprocessor may include memory, processing, interface resources, controllers, and counters. In some embodiments, the microprocessor may also include one or more programs stored in memory.

In some embodiments, the processing devices may be implemented by a centralized or distributed server, or server system. As used herein, term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

As used herein, terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user). The aforementioned examples are, of course, illustrative and not restrictive.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

In some embodiments, by maintaining the activity records for a period of time, the activity history database 120 may provide the distribution forecasting system 130 with a corpus of ground-truth data sufficient to training forecasting models to predict activity-related metrics across channels or groups of channels. To do so, the distribution forecasting system 130 may employ, e.g., machine learning models trained against a history of activities from two or more channels to predict characteristics of activities upon changes to the activity channels 110. For example, the distribution forecasting system 130 may be trained to forecast changes in activity distributions across channels when new channels are added.

For example, in some embodiments, where the activities are transactions, the distribution forecasting system 130 may be trained to predict channel metrics for, e.g., point-of-sale versus online channels of transactions upon the formation of a new point-of-sale or online channel of transactions. New point-of-sale channels can include, e.g., new retail stores, new retail partnerships, new outlets, new automated teller machines (ATMs), or other new brick-and-mortar locations at which to conduct transactions. New online channels may include, e.g., new retail websites, new online retail partnerships and outlets, among other online locations to conduct transactions.

In some embodiments, the channel metrics predicted using the distribution forecasting system 130 can include channel specific measures of, e.g., average order volume of transactions, number of transactions, frequency of transactions, total revenue, average revenue per time period (e.g., per day, per week, per month, per quarter, etc.), rate or probability of cannibalization of transactions from one channel by another, among other channel metrics.

In some embodiments, the channel metrics may customized or selected based on the types of activities being recorded by the activity history database 120. For example, the distribution forecasting system 130 may be trained to predict channel metrics based on channel activities including, e.g., communication channels (such as telephone, internet, broadband, cellular networks, etc.), media consumption (such as online streaming, cable, etc.), among other channels of various activities, such that the distribution forecasting system 130 may predict metrics related to variations between channels in, e.g., parties or entities involved in the activity, date of the activity, type of activity, location of the activity, activity status, activity approval status, among other data related each activity.

In some embodiments, the distribution forecasting system 130 may provide the metrics to users for user analysis and decision making. In some embodiments, user devices 140 may be in communication with the distribution forecasting system 130 to retrieve, access or otherwise obtain the predicted channel metrics. In some embodiments, the user device 140 may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Each user device 142a through 142n may communicated with the distribution forecasting system 130 to populate a channel metric user interface. In some embodiments, the channel metric user interface may depict the channel metrics, as well as historical activity details for each channel in suitable visualizations, such as, e.g., a data table, a graph, a line plot, a bar graph, or combinations thereof. In some embodiments, the user may interact with a respective user device 142a through 142n to interact with the channel metric user interface, and adjust displayed metrics according to, e.g., selected channels, selected activities or activity types, selected locations, selected dates, among other channel and activity attributes. In some embodiments, the distribution forecasting system 130 may therefore provide users, via the user devices 140, with an interactive forecasting of channel metrics based on training from the historical activity records in the historical activity database 120.

Figure 2:
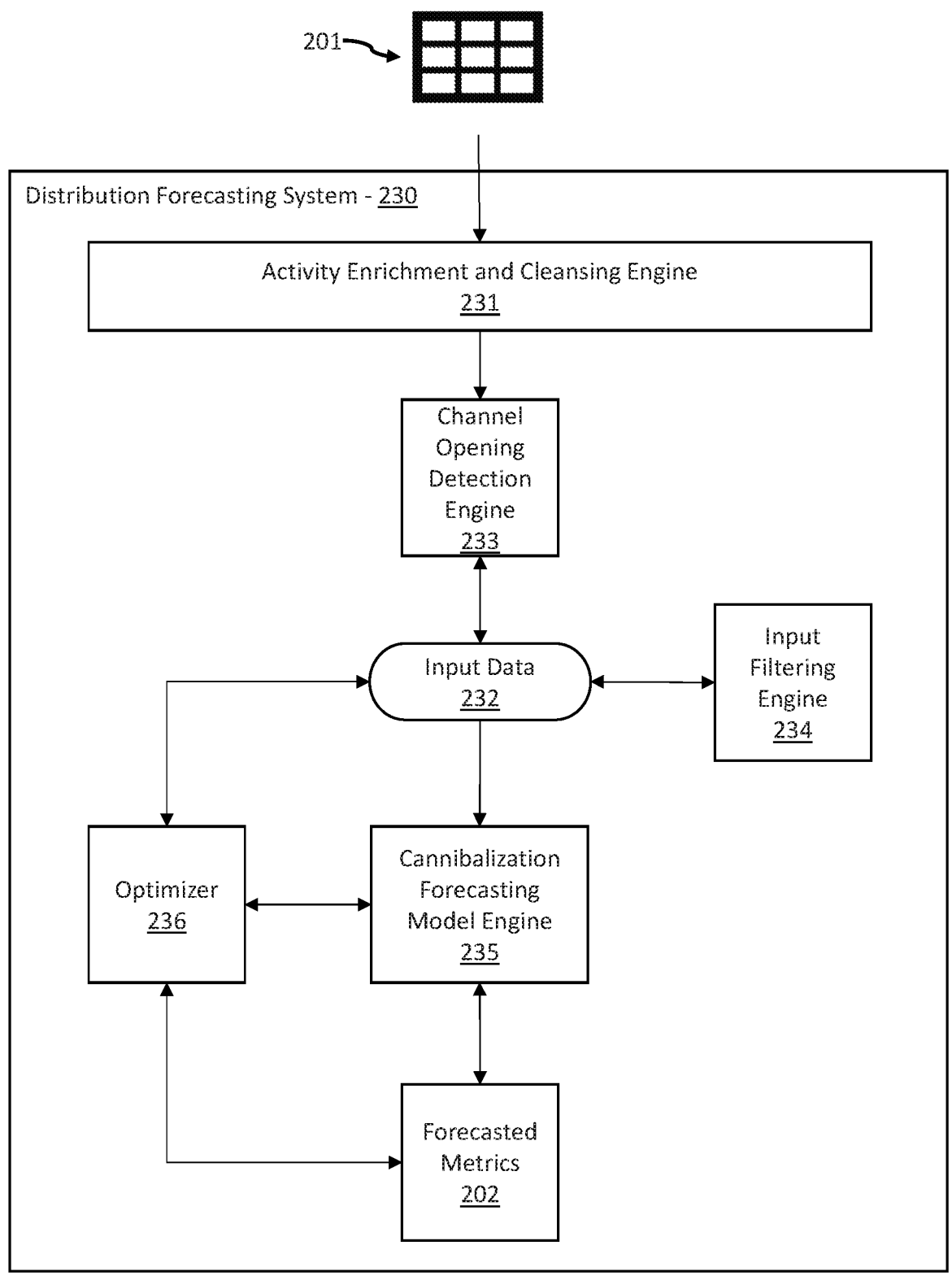

FIG. 2 illustrates a block diagram of another illustrative system and methodology for activity distribution across channels in accordance with one or more embodiments of the present disclosure.

In some embodiments, the distribution forecasting system 130 may include an embodiment of a distribution forecasting system 230 for forecasting channel metrics across a distribution of retail channels (e.g., online versus brick-and-mortar retail locations, among other retail channels). Accordingly, the distribution forecasting system 230 may include computer engines and components to train machine learning models of a cannibalization forecasting model engine 234 using activity records 201 from across channels for a given entity. Thus, the cannibalization forecasting model engine 234 may infer effects on distributions upon new or changing retail channels.

In some embodiments, the activity records 201 may originate from transaction authorization requests issued by a retail channel, such as a point-of-sale terminal, an online payment system, or other payment channel. Accordingly, the activity records 201 may be provided, via, e.g., the activity history database 120, directly from the retail channels. However, in some embodiments, the activity records 201 may be provided to the activity history database 120, and passed along to the distribution forecasting system 230, via a banking system or account management system that authorizes, and posts transactions associated with user accounts and commercial accounts. In either case, each transaction activity record 201 may include transaction details specified in a transaction authorization or authorization request issued by a payment system or recorded in a financial account of users or merchants, or both. Such details can includes, e.g., merchant identifier, merchant category code, location, point-of-sale terminal or online sale, user account identifier, date, quantity, items purchased, volume of items purchase, among others and combinations thereof.

In some embodiments, an activity enrichment and cleansing engine (AEC) engine 231 may enrich the activity records 201 with additional information, such as, e.g., Enterprise Merchant Insights (EMI), or other transaction enrichment. In some embodiments, the AEC engine 231 may produce application programming interface (API) calls to various merchant and retail data sources, both public and private, to identify and retrieve accurate entity data. For example, the AEC engine 231 may utilize APIs to request from EMI, including, e.g., cleansed and normalized data such as merchant names, merchant address, phone number, contact information, among other data. Similarly, the AEC engine 231 may issue API requests to public APIs such as for, e.g., mapping services (e.g., Google Maps, OpenStreet Maps, Mapbox, etc.), social media (e.g., Facebook, Instagram, Foursquare, Twitter, etc.), among other public services that may provide data regarding merchants and other entities. Accordingly, each transaction activity record 201 may be modified to include additional merchant-related data based on, e.g., the merchant identifier and/or location in the transaction data.

In some embodiments, the AEC engine 231 may employ the enriched activity records 201 to cleanse the records and, e.g., reduce redundant records, normalize merchant identifiers to a common format, among other standardizations across channels of the activity records 201 to reduce inconsistencies in merchant, channel and date identifiers.

In some embodiments, the enriched and cleansed activity records 201 are filtered and labeled to create a dataset of input data 232 to the cannibalization forecasting model engine 235. In some embodiments, a channel opening detection engine 233 may programmatically sort through the activity records 201 to identify retail opening dates where a new retail location is detected in the transaction data of the activity records 201. In some embodiments, the channel opening detection engine 233 may filter the corpus of activity records 201 by merchant identifier, such that a given merchant is selected and analyzed. The channel opening detection engine 233 may utilize the merchant-specific activity records 201 to identify dates associated with each retail channel (e.g., point-of-sale location, website, payment service, etc.). Using the channel-specific dates, the channel opening detection engine 233 may identify the earliest date of each channel or of a selected channel to infer a channel opening date.

For example, the distribution forecasting system 230 may be configured to predict the effect of new physical, or "brick-and-mortar", retail channels, including new store locations, on the distribution of transactions across a merchant's online and physical retail channels. Thus, for each merchant, the channel opening detection engine 233 may infer the opening date of each physical retail location, as per the dates and location data attributes of the activity records 201. Each transaction activity record 201 for a merchant may then be modified by the channel opening detection engine 233 to include a data attribute or flag specifying whether the transaction activity occurred before or after the opening of a given retail location. For example, the data attribute may include a retail location identifier and a flag for "before" or "after", or some other attribute for specifying the occurrence before or after the opening of that retail location. In some embodiments, the activity records 201 may include multiple retail locations having location specific opening dates. Thus, each transaction activity record 201 may have a location-specific attribute appended with the before or after flag for each retail location of the associated merchant.

Alternatively, or in addition, in some embodiments, a retail location for a given merchant is selected before detecting location openings. Thus, the corpus of activity records 201 are analyzed with respect to the selected location of the merchant. The channel opening detection engine 233 may then identify the dates associated with each transaction activity record 201 identifying the selected location for the selected merchant to identify the earliest date associated with the selected location. The channel opening detection engine 233 may infer the opening of the selected location at the detected earliest date. Each transaction activity 201 may then be compared against the inferred opening date and modified with a label or flag as "before" or "after" the retail location opening. In some embodiments, to increase the corpus of data, the dataset of activity records 201 may be recreated and labelled or flagged based on an inferred opening date of another selected retail location. Accordingly, a dataset of input data 232 can include sets of activity records 201 labelled relative to an inferred opening of each retail location for a given merchant according to the channel opening detection engine 233.

In some embodiments, the channel opening detection engine 233 uses the inferred opening date for each location to generate input data 232 including test data for the cannibalization forecasting model engine 235.

In some embodiments, the input data 232 may be used as training data to forecast channel metrics and the distribution of transaction activities and channel metrics across various channels upon changes to available channels. To do so, the cannibalization forecasting model engine 235 ingests channel characteristics from the transaction activity record 201 associated with the retail location, including, e.g., location, inferred opening date, time of year, merchant category code, among others and combinations thereof. In some embodiments, the cannibalization forecasting model engine 235 may ingest the channel characteristics and develop a forecast for transaction activity distribution for a prediction period after the inferred opening date, such as, e.g., one week in advance, one month in advance, one fiscal quarter in advance, one fiscal half in advance, one fiscal year in advance, among others and combinations thereof.

In some embodiments, the prediction may be for a single point in time after the opening date of the retail location, however, in some embodiments, the prediction may be a progression through time. As such, the cannibalization forecasting model engine 235 may be configured to form a forecast for a first period, and then based on the first period, develop a forecast for a second later period, and iteratively add additionally forecasts for a selected period extending from the opening date. For example, the iterative forecasts can be formed for, e.g. every day, every week, every months, etc. for, e.g., a one week, one month, one fiscal quarter, one fiscal half, one fiscal year, etc. into a prospective period beyond the opening date. However, in some embodiments, rather than iteratively predicting successive channel metrics and activity distributions across channels, the cannibalization forecasting model engine 235 may predict the progression through time, e.g., as a time-varying signal throughout the prospective period following the opening date.

In some embodiments, the cannibalization forecasting model engine 235 may be configured to utilize one or more exemplary AI/machine learning techniques chosen from, but not limited to, decision trees, boosting, support-vector machines, neural networks, nearest neighbor algorithms, Naive Bayes, bagging, random forests, and the like. In some embodiments and, optionally, in combination of any embodiment described above or below, an exemplary neutral network technique may be one of, without limitation, feedforward neural network, radial basis function network, recurrent neural network, convolutional network (e.g., U-net) or other suitable network. In some embodiments, due to the time-varying nature of the data being used and the forecasts being made, the cannibalization forecasting model engine 235 may employ recurrent neural networks to better capture the effects of historical trends on the future progressions. In some embodiments, the recurrent neural networks may employ, e.g., long short-term memory (LS™) or gated recovery units (GRU) to best leverage these historical trends. However, other neural network and neuron architectures are also contemplated. For example, to predict the progression of channel metrics and activity distributions as a time-varying signal, similar to spectral analysis predictions using, e.g., different neural network architectures such as multilayer perceptron (MLP), convolutional neural network (CNN), and deep tensor neural network (DTNN).

In some embodiments and, optionally, in combination of any embodiment described above or below, an exemplary implementation of Neural Network may be executed as follows:
i) Define Neural Network architecture/model,
ii) Transfer the input data to the exemplary neural network model,
iii) Train the exemplary model incrementally,
iv) determine the accuracy for a specific number of timesteps,
v) apply the exemplary trained model to process the newly-received input data,
vi) optionally and in parallel, continue to train the exemplary trained model with a predetermined periodicity.

In some embodiments and, optionally, in combination of any embodiment described above or below, the exemplary trained neural network model may specify a neural network by at least a neural network topology, a series of activation functions, and connection weights. For example, the topology of a neural network may include a configuration of nodes of the neural network and connections between such nodes. In some embodiments and, optionally, in combination of any embodiment described above or below, the exemplary trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination of any embodiment described above or below, the exemplary aggregation function may be a mathematical function that combines (e.g., sum, product, etc.) input signals to the node. In some embodiments and, optionally, in combination of any embodiment described above or below, an output of the exemplary aggregation function may be used as input to the exemplary activation function. In some embodiments and, optionally, in combination of any embodiment described above or below, the bias may be a constant value or function that may be used by the aggregation function and/or the activation function to make the node more or less likely to be activated.

Based on the model parameters, including node configurations, activation functions, weights, among other parameters, the cannibalization forecasting model engine 235 develops a forecasted metric 202 or forecasted metrics 202 for the prediction period. In some embodiments, the future metrics 202 may include one or more of, e.g., average order volume across all channels based on the new retail channel, total revenue of across all channels or incremental revenue across all channels relative to revenue prior to opening of the input opening date of the input data 232, cannibalization probability of the new retail channel relative to, e.g., online retail channels, among other metrics relative to the distribution of transaction activities across all channels of a given merchant upon the channel characteristics of a newly opened physical retail channels.

In some embodiments, because the ingested channel characteristics are pulled from historical data, the actual effects of the inferred opening of a physical retail channel is measureable in the subsequently recorded activity records 201. These subsequent activity records 201 relative to the inferred opening date form the training dataset of the input data 232 with which to compare the forecasted metrics 202 of the cannibalization forecasting model engine 235.

In some embodiments, the subsequently recorded activity records 201 are ingested by an optimizer 236. In some embodiments, the optimizer 236 may identify in the input data 232 the subsequently recorded activity records 201 occurring during the prediction period and measure channel metrics corresponding to the forecasted metrics 202. For example, the optimizer 236 may measure the total revenue during the prediction, the average order volume during the prediction period, the average order volume in the new retail channel relative to pre-existing retail channels or online retail channels, incremental revenue relative to before the inferred open date, among other metrics based on the aggregate of the subsequently recorded activity records 201 in the prediction period.

In some embodiments, using the measured channel metrics, the optimizer 236 determines an error of the forecasted metrics 202 using a loss functions. For example, the optimizer 236 may employ, e.g., a mean squared error (MSE) or mean squared deviation (MSD) function, an average absolute deviation (AAD), a least absolute deviation (LAD), or other suitable loss function. This error may then be back-propagated to the model or models of the cannibalization forecasting model engine 235 using a suitable optimization algorithm with backpropagation, such as, e.g., stochastic gradient descent or other optimization algorithm. Such optimization updates the parameters of the cannibalization forecasting model engine 235 to more closely fit the corpus of the activity records 201, for better, more accurate predictions when using new input data.

Figure 3:
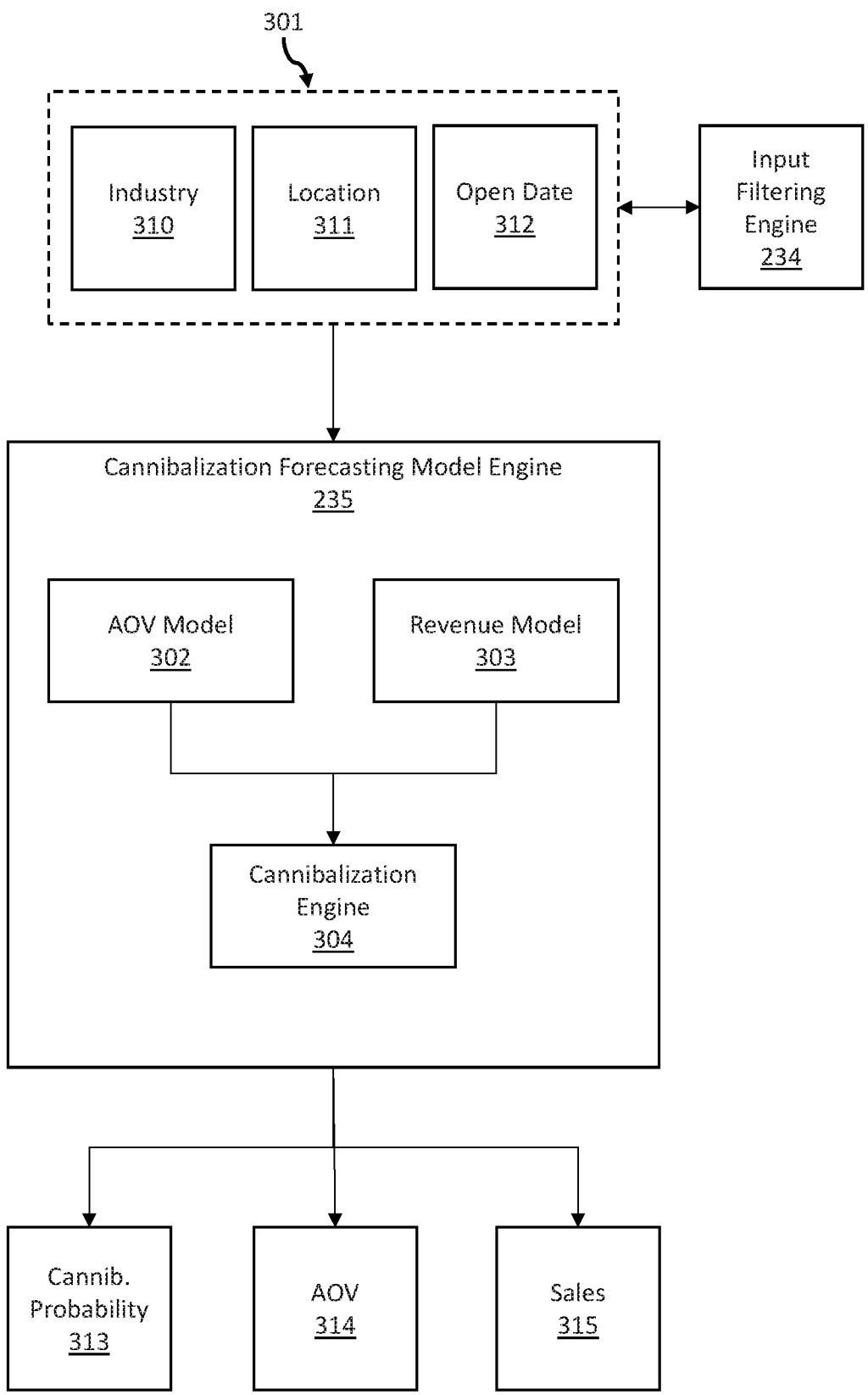

FIG. 3 illustrates a block diagram of another illustrative system and methodology for activity distribution across channels in accordance with one or more embodiments of the present disclosure.

In some embodiments of the cannibalization forecasting model engine 235 can include a cannibalization forecasting model engine 235 having an average-order-volume (AOV) model 303 and a revenue model 302 for predicting AOV and revenue in the prediction period after a projected opening of a planned retail location. A cannibalization engine 304 may then generate a cannibalization metric based on the AOV and the revenue forecasted by the AOV model 303 and the revenue model 302.

In some embodiments, to generate the forecasted channel metrics, including AOV, revenue, and cannibalization, a user may provide a planned retail location profile 301 associated with the planned retail location. In some embodiments, the planned retail location profile 301 may include planned retail location attributes, such as, e.g., industry 310 or Merchant Category Code (MCC), location 311 of the planned retail location, projected open date 312 of the planned retail location, among other attributes, such as time of year, merchant size or revenue, type of retail location (e.g., third party retailer, first party retailer, kiosk, in-mall store, supermarket, etc.), among other attributes. In some embodiments, the location 311 attribute identifies a planned location associated with the planned retail location, industry 310 attribute identifies a retail category or industry associated with the planned retail location, and the open date 312 attribute identifies a projected date of the year of opening the planned retail location.

In some embodiments, the forecasting models include the AOV model 302 to predict an average order volume across all channels for a prediction period based on training, as described above. In some embodiments, the AOV may be forecasted for physical retail channels, online retail channels or a combination thereof. In some embodiments, the AOV model 302 may include hardware elements, software elements, or a combination thereof for implementing software instructions causing an AOV model algorithm to be performed to forecast AOV. For example, in some embodiments, the AOV model 302 may include, e.g., one or more processing devices in communication with a memory device storing the software instructions and/or AOV forecasting algorithm. As such, the processors may be configured to utilize the model algorithm stored on the memory device to implement the AOV model 302 and forecast AOV. In some embodiments, the memory device may include one or more non-transitory storage solutions, such as, e.g., hard drives, solid state drives, flash memory, random-access memory (RAM), cache, or other storage solution in communication with the processing devices via, e.g., a bus (e.g., Serial AT Attachment (SATA) or other bus interface), universal serial bus (USB), peripheral component interconnect express (PCIe), M.2, Non-Volatile Memory express (NVMe), or other data interconnect. In some embodiments, the AOV model 302 software instructions and/or model algorithm may be received via a network connection, such as, e.g., ethernet, WiFi, or other network connections.

In some embodiments, the prediction may be for a single point in time after the specified open date 312 of the planned retail location, however, in some embodiments, the prediction may be a progression through time. As such, the AOV model 302 may be configured to form a forecast for a first period, and then based on the first period, develop a forecast for a second later period, and iteratively add additionally forecasts for a selected period extending from the opening date. For example, the iterative forecasts can be formed for, e.g. every day, every week, every months, etc. for, e.g., a one week, one month, one fiscal quarter, one fiscal half, one fiscal year, etc. into a prospective period beyond the opening date. In some embodiments, due to the time-varying nature of the data being used and the forecasts being made, the AOV model 302 may employ one or more recurrent neural networks to better capture the effects of historical trends on the future progressions. In some embodiments, the recurrent neural networks may employ, e.g., long short-term memory (LSTM) or gated recovery units (GRU) to best leverage these historical trends. However, other neural network and neuron architectures are also contemplated, such as regression functions used in a random forest model, ensemble of trees, multi-layer perceptron (MLP), or other architecture.

However, in some embodiments, rather than iteratively predicting successive channel metrics and activity distributions across channels, the AOV model 302 may predict the progression through time, e.g., as a time-varying signal throughout the prospective period following the opening date. For example, to predict the progression of AOV for all of the channels together, for the planned retail location and for the pre-existing channels, or across each channel as a time-varying signal, similar to spectral analysis predictions using, e.g., different neural network architectures such as multilayer perceptron (MLP), convolutional neural network (CNN), and deep tensor neural network (DTNN).

In some embodiments, the revenue model 303 may forecast total revenue across all retail channels or incremental revenue relative to a present revenue based on training, as described above. In some embodiments, the revenue (total or incremental) may be forecasted for physical retail channels, online retail channels or a combination thereof. In some embodiments, the revenue may be forecasted for physical retail channels, online retail channels or a combination thereof. In some embodiments, the revenue model 303 may include hardware elements, software elements, or a combination thereof for implementing software instructions causing a revenue model algorithm to be performed to forecast revenue. For example, in some embodiments, the revenue model 303 may include, e.g., one or more processing devices in communication with a memory device storing the software instructions and/or revenue forecasting algorithm. As such, the processors may be configured to utilize the model algorithm stored on the memory device to implement the revenue model 303 and forecast revenue. In some embodiments, the memory device may include one or more non-transitory storage solutions, such as, e.g., hard drives, solid state drives, flash memory, random-access memory (RAM), cache, or other storage solution in communication with the processing devices via, e.g., a bus (e.g., Serial AT Attachment (SATA) or other bus interface), universal serial bus (USB), peripheral component interconnect express (PCIe), M.2, Non-Volatile Memory express (NVMe), or other data interconnect. In some embodiments, the REVENUE model 303 software instructions and/or model algorithm may be received via a network connection, such as, e.g., ethernet, WiFi, or other network connections.

In some embodiments, the prediction may be for a single point in time after the specified open date 312 of the planned retail location, however, in some embodiments, the prediction may be a progression through time. As such, the revenue model 303 may be configured to form a forecast for a first period, and then based on the first period, develop a forecast for a second later period, and iteratively add additionally forecasts for a selected period extending from the opening date. For example, the iterative forecasts can be formed for, e.g. every day, every week, every months, etc. for, e.g., a one week, one month, one fiscal quarter, one fiscal half, one fiscal year, etc. into a prospective period beyond the opening date. In some embodiments, due to the time-varying nature of the data being used and the forecasts being made, the revenue model 303 may employ one or more recurrent neural networks to better capture the effects of historical trends on the future progressions. In some embodiments, the recurrent neural networks may employ, e.g., long short-term memory (LSTM) or gated recovery units (GRU) to best leverage these historical trends. However, other neural network and neuron architectures are also contemplated, such as regression functions used in a random forest model, ensemble of trees, multi-layer perceptron (MLP), or other architecture.

However, in some embodiments, rather than iteratively predicting successive channel metrics and activity distributions across channels, the revenue model 303 may predict the progression through time, e.g., as a time-varying signal throughout the prospective period following the opening date. For example, to predict the progression of revenue for all of the channels together, for the planned retail location and for the pre-existing channels, or across each channel as a time-varying signal, similar to spectral analysis predictions using, e.g., different neural network architectures such as multilayer perceptron (MLP), convolutional neural network (CNN), and deep tensor neural network (DTNN).

In some embodiments, the forecasted AOV and forecasted total or incremental revenue across all channels (including the planned retail location) may be provided to a cannibalization engine 304. In some embodiments, the cannibalization engine 304 utilizes the AOV and revenue to determine a cannibalization metric as the channel metric. In some embodiments, the cannibalization metric is a function of AOV and revenue indicative of a percentage of cannibalized sales by the planned retail location. However, in some embodiments, AOV is not used directly to calculate cannibalization, but is rather used as a check for differences between pre-opening date and post-opening date of the planned Herein, the term "cannibalize" or "cannibalized sales" refers to the amount of revenue diverted from pre-existing transaction activity channels to the planned retail location, and is thus indicative of sales by the planned retail location that would otherwise occur in the pre-existing channels. Accordingly, the cannibalization metric may denote a distribution of transaction activities between the planned retail location and the pre-existing sales channels. Although, in some embodiments, the AOV and revenue are also forecasted for each individual transaction activity channel for more granular analysis and visualization of a projected distribution of transaction activities across the transaction activity channels before and after opening of the planned retail location.

In some embodiments, cannibalization may be calculated such that it quantifies activity lost by the pre-existing channels to planned retail location. For example, cannibalization may be the loss of existing channel revenue divided by the revenue of the new retail channel, where Existing Channels includes both existing physical locations in the specified area and online sales (if applicable) from customers living in the specified area. Typically, you can look at "area" by a Core-Based Statistical Area (CBSA) or other grouping mechanism. Other formulations may be employed, such as the loss of existing channel revenue minus the revenue of the new retail channel, or loss of revenue across all channels (including the new retail channel) divided by the revenue of the new retail channel, among others.

In some embodiments, the channel metrics including the AOV 314 and revenue 315, as well as the cannibalization probability 313 derived therefrom, may be output to the channel metric user interface of the user devices 140 described above. In some embodiments, the channel metric user interface may provide the user with access to an input filtering tool to initiate requests to the input filtering engine 234. In some embodiments, the input filtering engine 234 may provide selectable filters for the planned retail location profile 301 to adjust planned retail location attributes 310 through 312. For example, prior to a cannibalization forecast, as well as after generation and display of such a forecast, the user may select filters to set particular planned retail location attributes 310 through 312. In some embodiments, the input filtering engine 234 may enable selectable ranges of, e.g., industries 310, locations 311 and open dates 312 to provide the user with the ability to test planned retail location profiles 301 and determine an optimum profile that minimizes cannibalization and maximizes revenue.

In some embodiments, the input filtering engine 234 may enable the selection of multiple or ranges of values for each attribute, such that the channel metrics 313 through 315 include sets of channel metrics 313 through 315 for each combination of planned retail location attributes 310 through 312 on a single display for more efficient testing and comparison. Accordingly, the cannibalization forecasting model engine 235 may identify in the output metrics 313 through 315 a minimum cannibalization based on a comparison of the distribution of cannibalization probability 313 across the sets of channel metrics 313 through 315. Alternatively, or in addition, the user may quickly visually compare the distribution of results based on the combinations of attributes 310 through 312 quickly and efficiently identify a minimum cannibalization metric 313, or other channel metric 313 through 315.

Accordingly, the cannibalization forecasting model engine 235 may utilize various attributes of a planned retail location to quickly and efficiently identify the effects such a retail location would have on transaction activities across all channels of transaction activities, including online and physical retail channels. Such results may be supplied to a user via a specially designed user interface as described above for more efficient and extensive analyses of transaction activity distributions across channels.

Figure 4:
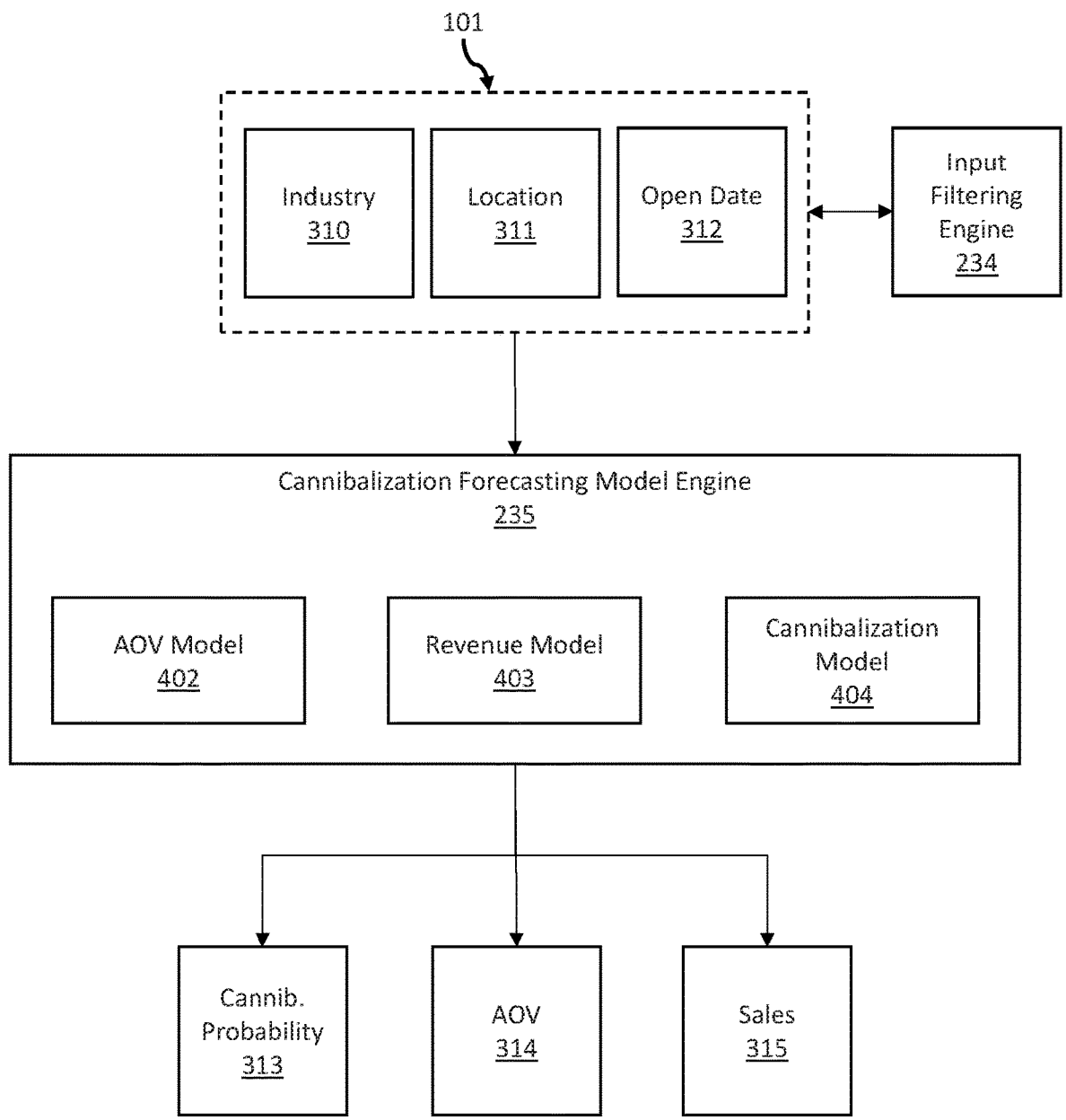

FIG. 4 illustrates a block diagram of another illustrative system and methodology for activity distribution across channels in accordance with one or more embodiments of the present disclosure.

In some embodiments of the cannibalization forecasting model engine 235 can include a cannibalization forecasting model engine 235 having an average-order-volume (AOV) model 402, a revenue model 403 and a cannibalization model 404 for predicting AOV, revenue and a cannibalization probability in the prediction period after a projected opening of a planned retail location.

In some embodiments, to generate the forecasted channel metrics, including AOV, revenue, and cannibalization, a user may provide a planned retail location profile 301 associated with the planned retail location. In some embodiments, the planned retail location profile 301 may include planned retail location attributes, such as, e.g., industry 310 or Merchant Category Code (MCC), location 311 of the planned retail location, projected open date 312 of the planned retail location, among other attributes, such as time of year, merchant size or revenue, type of retail location (e.g., third party retailer, first party retailer, kiosk, in-mall store, supermarket, etc.), among other attributes. In some embodiments, the location 311 attribute identifies a planned location associated with the planned retail location, industry 310 attribute identifies a retail category or industry associated with the planned retail location, and the open date 312 attribute identifies a projected date of the year of opening the planned retail location. In some embodiments, the cannibalization forecasting model engine 235 may utilize one or more cannibalization forecasting models to predict the channel metrics associated with cannibalization based on the planned retail location profile 301 and associated attributes.

In some embodiments, the forecasting models include the AOV model 402 to predict an average order volume across all channels for a prediction period based on training, as described above. In some embodiments, the AOV may be forecasted for physical retail channels, online retail channels or a combination thereof. In some embodiments, the AOV model 402 may include hardware elements, software elements, or a combination thereof for implementing software instructions causing an AOV model algorithm to be performed to forecast AOV. For example, in some embodiments, the AOV model 402 may include, e.g., one or more processing devices in communication with a memory device storing the software instructions and/or AOV forecasting algorithm. As such, the processors may be configured to utilize the model algorithm stored on the memory device to implement the AOV model 402 and forecast AOV. In some embodiments, the memory device may include one or more non-transitory storage solutions, such as, e.g., hard drives, solid state drives, flash memory, random-access memory (RAM), cache, or other storage solution in communication with the processing devices via, e.g., a bus (e.g., Serial AT Attachment (SATA) or other bus interface), universal serial bus (USB), peripheral component interconnect express (PCIe), M.2, Non-Volatile Memory express (NVMe), or other data interconnect. In some embodiments, the AOV model 402 software instructions and/or model algorithm may be received via a network connection, such as, e.g., ethernet, WiFi, or other network connections.

In some embodiments, the prediction may be for a single point in time after the specified open date 312 of the planned retail location, however, in some embodiments, the prediction may be a progression through time. As such, the AOV model 402 may be configured to form a forecast for a first period, and then based on the first period, develop a forecast for a second later period, and iteratively add additionally forecasts for a selected period extending from the opening date. For example, the iterative forecasts can be formed for, e.g. every day, every week, every months, etc. for, e.g., a one week, one month, one fiscal quarter, one fiscal half, one fiscal year, etc. into a prospective period beyond the opening date. In some embodiments, due to the time-varying nature of the data being used and the forecasts being made, the AOV model 402 may employ one or more recurrent neural networks to better capture the effects of historical trends on the future progressions. In some embodiments, the recurrent neural networks may employ, e.g., long short-term memory (LSTM) or gated recovery units (GRU) to best leverage these historical trends. However, other neural network and neuron architectures are also contemplated, such as regression functions used in a random forest model, ensemble of trees, multi-layer perceptron (MLP), or other architecture.

However, in some embodiments, rather than iteratively predicting successive channel metrics and activity distributions across channels, the AOV model 402 may predict the progression through time, e.g., as a time-varying signal throughout the prospective period following the opening date. For example, to predict the progression of AOV for all of the channels together, for the planned retail location and for the pre-existing channels, or across each channel as a time-varying signal, similar to spectral analysis predictions using, e.g., different neural network architectures such as multilayer perceptron (MLP), convolutional neural network (CNN), and deep tensor neural network (DTNN).

In some embodiments, the revenue model 403 may forecast total revenue across all retail channels or incremental revenue relative to a present revenue based on training, as described above. In some embodiments, the revenue (total or incremental) may be forecasted for physical retail channels, online retail channels or a combination thereof. In some embodiments, the revenue may be forecasted for physical retail channels, online retail channels or a combination thereof. In some embodiments, the revenue model 403 may include hardware elements, software elements, or a combination thereof for implementing software instructions causing a revenue model algorithm to be performed to forecast revenue. For example, in some embodiments, the revenue model 403 may include, e.g., one or more processing devices in communication with a memory device storing the software instructions and/or revenue forecasting algorithm. As such, the processors may be configured to utilize the model algorithm stored on the memory device to implement the revenue model 403 and forecast revenue. In some embodiments, the memory device may include one or more non-transitory storage solutions, such as, e.g., hard drives, solid state drives, flash memory, random-access memory (RAM), cache, or other storage solution in communication with the processing devices via, e.g., a bus (e.g., Serial AT Attachment (SATA) or other bus interface), universal serial bus (USB), peripheral component interconnect express (PCIe), M.2, Non-Volatile Memory express (NVMe), or other data interconnect. In some embodiments, the REVENUE model 403 software instructions and/or model algorithm may be received via a network connection, such as, e.g., ethernet, WiFi, or other network connections.

In some embodiments, the prediction may be for a single point in time after the specified open date 312 of the planned retail location, however, in some embodiments, the prediction may be a progression through time. As such, the revenue model 403 may be configured to form a forecast for a first period, and then based on the first period, develop a forecast for a second later period, and iteratively add additionally forecasts for a selected period extending from the opening date. For example, the iterative forecasts can be formed for, e.g. every day, every week, every months, etc. for, e.g., a one week, one month, one fiscal quarter, one fiscal half, one fiscal year, etc. into a prospective period beyond the opening date. In some embodiments, due to the time-varying nature of the data being used and the forecasts being made, the revenue model 403 may employ one or more recurrent neural networks to better capture the effects of historical trends on the future progressions. In some embodiments, the recurrent neural networks may employ, e.g., long short-term memory (LSTM) or gated recovery units (GRU) to best leverage these historical trends. However, other neural network and neuron architectures are also contemplated, such as regression functions used in a random forest model, ensemble of trees, multi-layer perceptron (MLP), or other architecture.

However, in some embodiments, rather than iteratively predicting successive channel metrics and activity distributions across channels, the revenue model 403 may predict the progression through time, e.g., as a time-varying signal throughout the prospective period following the opening date. For example, to predict the progression of revenue for all of the channels together, for the planned retail location and for the pre-existing channels, or across each channel as a time-varying signal, similar to spectral analysis predictions using, e.g., different neural network architectures such as multilayer perceptron (MLP), convolutional neural network (CNN), and deep tensor neural network (DTNN).

In some embodiments, the cannibalization model 404 may forecast cannibalization from pre-existing transaction activity channels prior to the specified open date 312 by the planned retail location based on training, as described above. In some embodiments, the cannibalization may be forecasted for physical retail channels, online retail channels or a combination thereof. In some embodiments, the cannibalization may be forecasted for physical retail channels, online retail channels or a combination thereof. In some embodiments, the cannibalization model 404 may include hardware elements, software elements, or a combination thereof for implementing software instructions causing a cannibalization model algorithm to be performed to forecast cannibalization. For example, in some embodiments, the cannibalization model 404 may include, e.g., one or more processing devices in communication with a memory device storing the software instructions and/or cannibalization forecasting algorithm. As such, the processors may be configured to utilize the model algorithm stored on the memory device to implement the cannibalization model 404 and forecast cannibalization. In some embodiments, the memory device may include one or more non-transitory storage solutions, such as, e.g., hard drives, solid state drives, flash memory, random-access memory (RAM), cache, or other storage solution in communication with the processing devices via, e.g., a bus (e.g., Serial AT Attachment (SATA) or other bus interface), universal serial bus (USB), peripheral component interconnect express (PCIe), M.2, Non-Volatile Memory express (NVMe), or other data interconnect. In some embodiments, the CANNIBALIZATION model 404 software instructions and/or model algorithm may be received via a network connection, such as, e.g., ethernet, WiFi, or other network connections.

In some embodiments, the prediction may be for a single point in time after the specified open date 312 of the planned retail location, however, in some embodiments, the prediction may be a progression through time. As such, the cannibalization model 404 may be configured to form a forecast for a first period, and then based on the first period, develop a forecast for a second later period, and iteratively add additionally forecasts for a selected period extending from the opening date. For example, the iterative forecasts can be formed for, e.g. every day, every week, every months, etc. for, e.g., a one week, one month, one fiscal quarter, one fiscal half, one fiscal year, etc. into a prospective period beyond the opening date. In some embodiments, due to the time-varying nature of the data being used and the forecasts being made, the cannibalization model 404 may employ one or more recurrent neural networks to better capture the effects of historical trends on the future progressions. In some embodiments, the recurrent neural networks may employ, e.g., long short-term memory (LSTM) or gated recovery units (GRU) to best leverage these historical trends. However, other neural network and neuron architectures are also contemplated, such as regression functions used in a random forest model, ensemble of trees, multilayer perceptron (MLP), or other architecture.

However, in some embodiments, rather than iteratively predicting successive channel metrics and activity distributions across channels, the cannibalization model 404 may predict the progression through time, e.g., as a time-varying signal throughout the prospective period following the opening date. For example, to predict the progression of cannibalization for all of the channels together, for the planned retail location and for the pre-existing channels, or across each channel as a time-varying signal, similar to spectral analysis predictions using, e.g., different neural network architectures such as multilayer perceptron (MLP), convolutional neural network (CNN), and deep tensor neural network (DTNN).

In some embodiments, the channel metrics including the cannibalization probability 313, the AOV 314 and revenue 315 may be output to the channel metric user interface of the user devices 140 described above. In some embodiments, the channel metric user interface may provide the user with access to an input filtering tool to initiate requests to the input filtering engine 234. In some embodiments, the input filtering engine 234 may provide selectable filters for the planned retail location profile 301 to adjust planned retail location attributes 310 through 312. For example, prior to a cannibalization forecast, as well as after generation and display of such a forecast, the user may select filters to set particular planned retail location attributes 310 through 312. In some embodiments, the input filtering engine 234 may enable selectable ranges of, e.g., industries 310, locations 311 and open dates 312 to provide the user with the ability to test planned retail location profiles 301 and determine an optimum profile that minimizes cannibalization and maximizes revenue.

In some embodiments, the input filtering engine 234 may enable the selection of multiple or ranges of values for each attribute, such that the channel metrics 313 through 315 include sets of channel metrics 313 through 315 for each combination of planned retail location attributes 310 through 312 on a single display for more efficient testing and comparison. Accordingly, the cannibalization forecasting model engine 235 may identify in the output metrics 313 through 315 a minimum cannibalization based on a comparison of the distribution of cannibalization probability 313 across the sets of channel metrics 313 through 315. Alternatively, or in addition, the user may quickly visually compare the distribution of results based on the combinations of attributes 310 through 312 quickly and efficiently identify a minimum cannibalization metric 313, or other channel metric 313 through 315.

Accordingly, the cannibalization forecasting model engine 235 may utilize various attributes of a planned retail location to quickly and efficiently identify the effects such a retail location would have on transaction activities across all channels of transaction activities, including online and physical retail channels. Such results may be supplied to a user via a specially designed user interface as described above for more efficient and extensive analyses of transaction activity distributions across channels.

Figure 5:
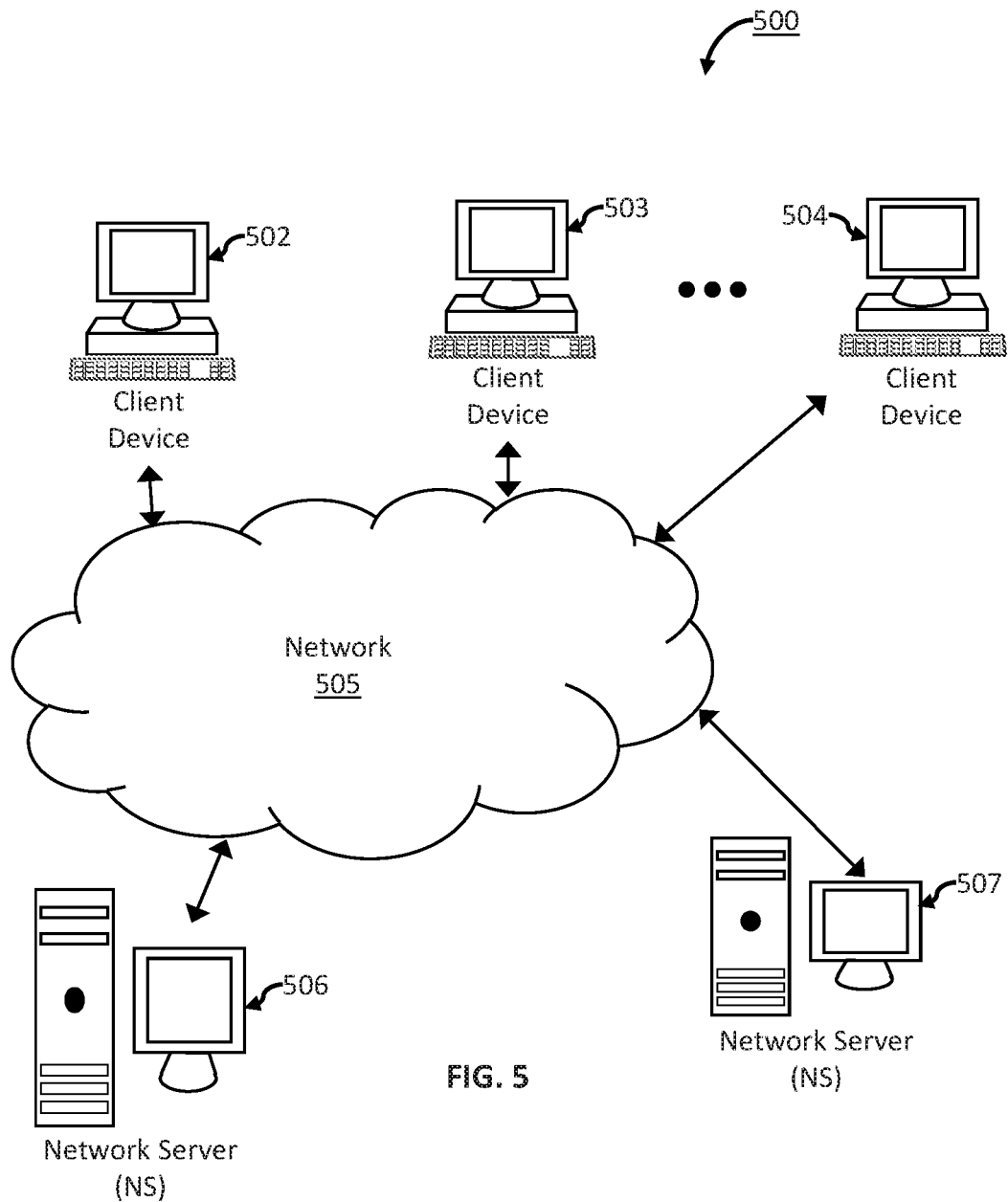

FIG. 5 depicts a block diagram of an exemplary computer-based system and platform 500 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the illustrative computing devices and the illustrative computing components of the exemplary computer-based system and platform 500 may be configured to manage a large number of members and concurrent transactions, as detailed herein. In some embodiments, the exemplary computer-based system and platform 500 may be based on a scalable computer and network architecture that incorporates varies strategies for assessing the data, caching, searching, and/or database connection pooling. An example of the scalable architecture is an architecture that is capable of operating multiple servers.

In some embodiments, referring to FIG. 5, members 502-504 (e.g., clients) of the exemplary computer-based system and platform 500 may include virtually any computing device capable of receiving and sending a message over a network (e.g., cloud network), such as network 505, to and from another computing device, such as servers 506 and 507, each other, and the like. In some embodiments, the member devices 502-504 may be personal computers, multiprocessor systems, microprocessor-based or programmable consumer electronics, network PCs, and the like. In some embodiments, one or more member devices within member devices 502-504 may include computing devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile computing device, and the like. In some embodiments, one or more member devices within member devices 502-504 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, satellite, ZigBee, etc.). In some embodiments, one or more member devices within member devices 502-504 may include may run one or more applications, such as Internet browsers, mobile applications, voice calls, video games, videoconferencing, and email, among others. In some embodiments, one or more member devices within member devices 502-504 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 502-504 may be specifically programmed by either Java, .Net, QT, C, C++ and/or other suitable programming language. In some embodiments, one or more member devices within member devices 502-504 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 505 may provide network access, data transport and/or other services to any computing device coupled to it. In some embodiments, the exemplary network 505 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 505 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 505 may include and implement, as an alternative or in conjunction with one or more of the above, a WiMAX architecture defined by the WiMAX forum. In some embodiments and, optionally, in combination of any embodiment described above or below, the exemplary network 505 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 505 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, satellite and any combination thereof. In some embodiments, the exemplary network 505 may also include mass storage, such as network attached storage (NAS), a storage area network (SAN), a content delivery network (CDN) or other forms of computer or machine readable media.

In some embodiments, the exemplary server 506 or the exemplary server 507 may be a web server (or a series of servers) running a network operating system, examples of which may include but are not limited to Microsoft Windows Server, Novell NetWare, or Linux. In some embodiments, the exemplary server 506 or the exemplary server 507 may be used for and/or provide cloud and/or network computing. Although not shown in FIG. 5, in some embodiments, the exemplary server 506 or the exemplary server 507 may have connections to external systems like email, SMS messaging, text messaging, ad content providers, etc. Any of the features of the exemplary server 506 may be also implemented in the exemplary server 507 and vice versa.

In some embodiments, one or more of the exemplary servers 506 and 507 may be specifically programmed to perform, in non-limiting example, as authentication servers, search servers, email servers, social networking services servers, SMS servers, IM servers, MMS servers, exchange servers, photo-sharing services servers, advertisement providing servers, financial/banking-related services servers, travel services servers, or any similarly suitable service-base servers for users of the member computing devices 501-504.

In some embodiments and, optionally, in combination of any embodiment described above or below, for example, one or more exemplary computing member devices 502-504, the exemplary server 506, and/or the exemplary server 507 may include a specifically programmed software module that may be configured to send, process, and receive information using a scripting language, a remote procedure call, an email, a tweet, Short Message Service (SMS), Multimedia Message Service (MMS), instant messaging (IM), internet relay chat (IRC), mIRC, Jabber, an application programming interface, Simple Object Access Protocol (SOAP) methods, Common Object Request Broker Architecture (CORBA), HTTP (Hypertext Transfer Protocol), REST (Representational State Transfer), or any combination thereof.

Figure 6:
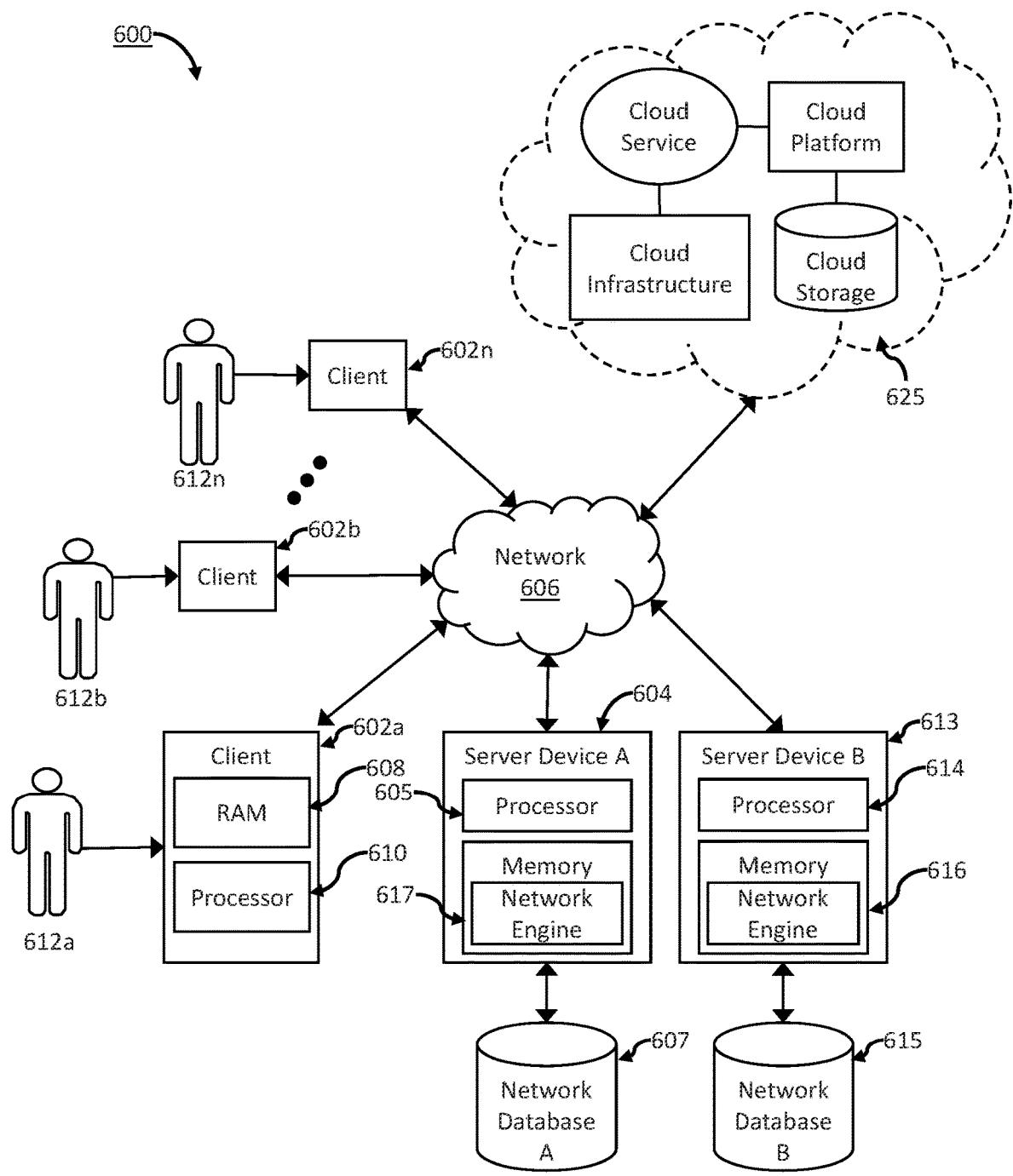

FIG. 6 depicts a block diagram of another exemplary computer-based system and platform 600 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing devices 602a, 602b thru 602n shown each at least includes a computer-readable medium, such as a random-access memory (RAM) 608 coupled to a processor 610 or FLASH memory. In some embodiments, the processor 610 may execute computer-executable program instructions stored in memory 608. In some embodiments, the processor 610 may include a microprocessor, an ASIC, and/or a state machine. In some embodiments, the processor 610 may include, or may be in communication with, media, for example computer-readable media, which stores instructions that, when executed by the processor 610, may cause the processor 610 to perform one or more steps described herein. In some embodiments, examples of computer-readable media may include, but are not limited to, an electronic, optical, magnetic, or other storage or transmission device capable of providing a processor, such as the processor 610 of client 602a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, member computing devices 602a through 602n may also comprise a number of external or internal devices such as a mouse, a CD-ROM, DVD, a physical or virtual keyboard, a display, or other input or output devices. In some embodiments, examples of member computing devices 602a through 602n (e.g., clients) may be any type of processor-based platforms that are connected to a network 606 such as, without limitation, personal computers, digital assistants, personal digital assistants, smart phones, pagers, digital tablets, laptop computers, Internet appliances, and other processor-based devices. In some embodiments, member computing devices 602a through 602n may be specifically programmed with one or more application programs in accordance with one or more principles/methodologies detailed herein. In some embodiments, member computing devices 602a through 602n may operate on any operating system capable of supporting a browser or browser-enabled application, such as Microsoft™ Windows™, and/or Linux. In some embodiments, member computing devices 602a through 602n shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 602a through 602n, users, 612a through 602n, may communicate over the exemplary network 606 with each other and/or with other systems and/or devices coupled to the network 606. As shown in FIG. 6, exemplary server devices 604 and 613 may be also coupled to the network 606. In some embodiments, one or more member computing devices 602a through 602n may be mobile clients.

In some embodiments, at least one database of exemplary databases 607 and 615 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 7:
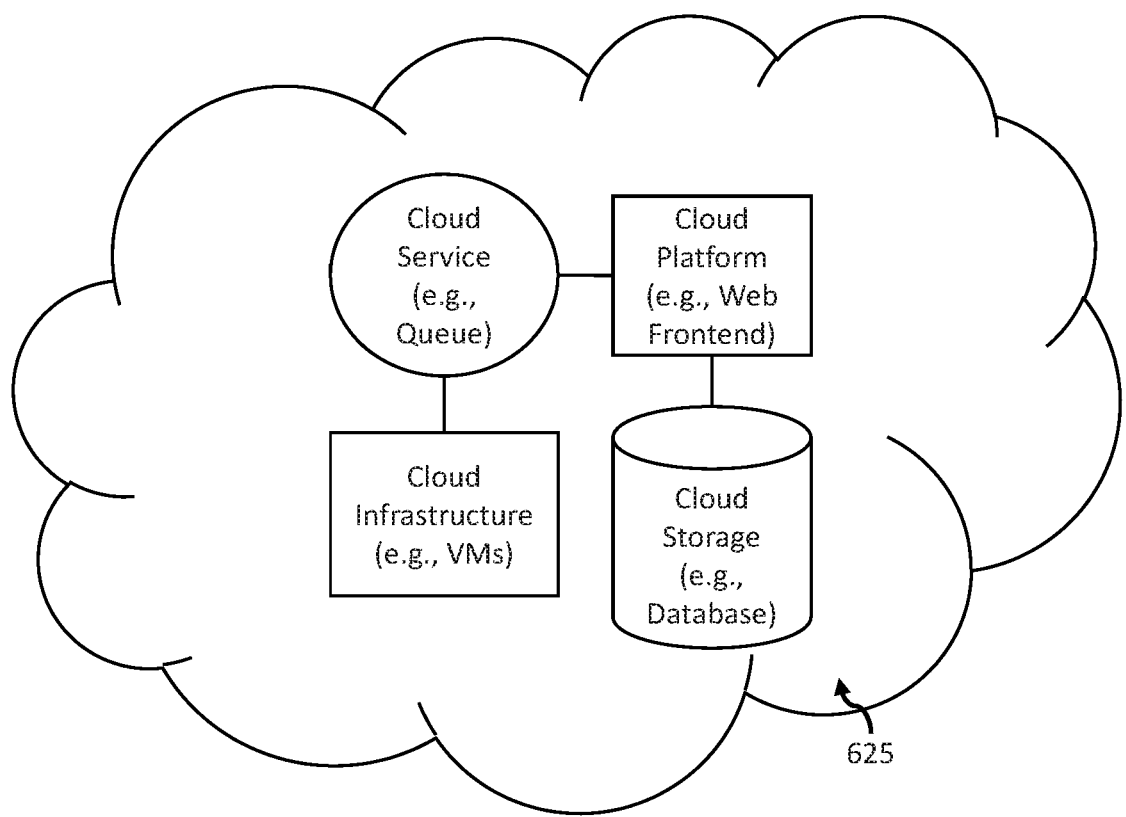
Figure 8:
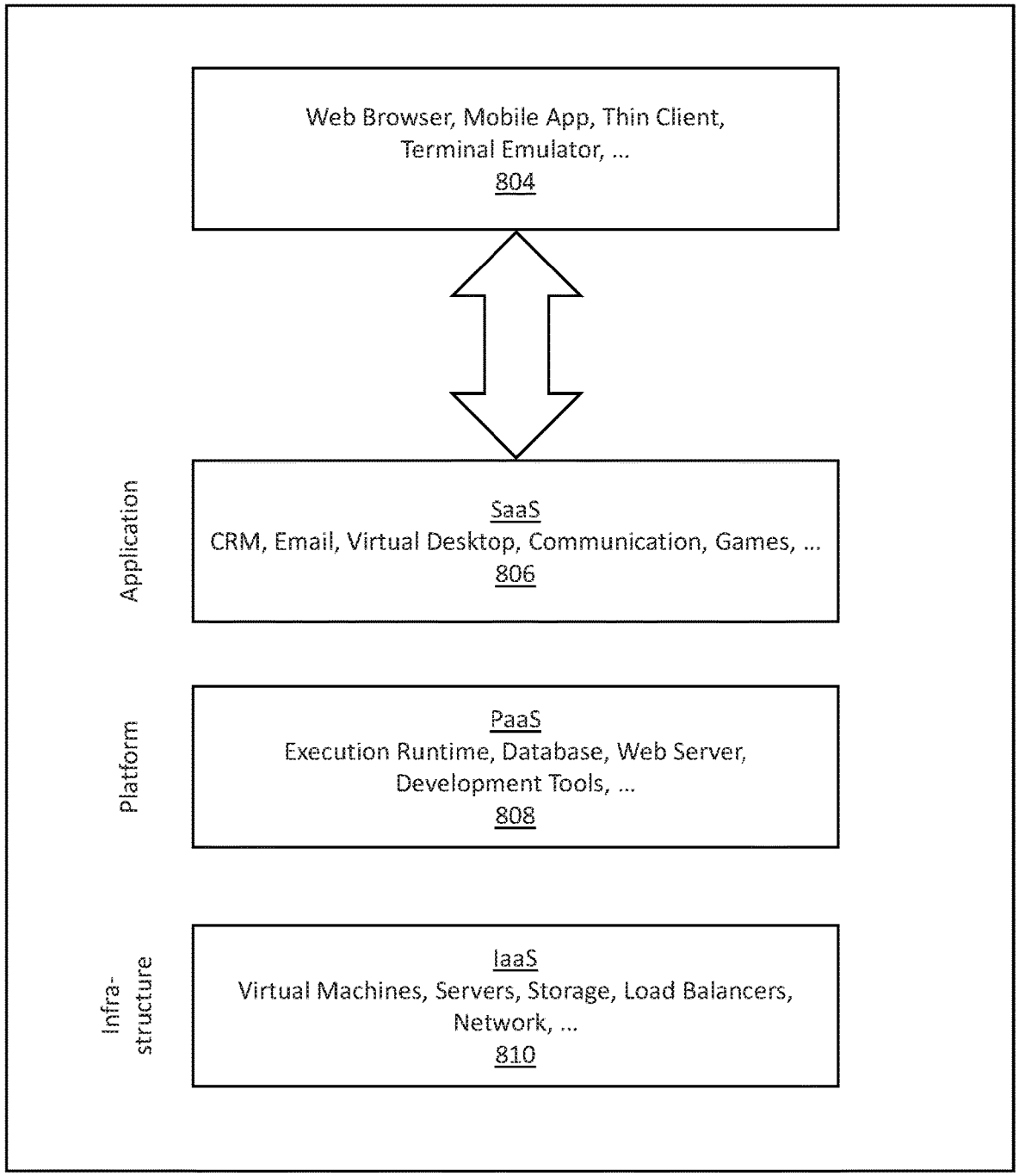

In some embodiments, the exemplary inventive computer-based systems/platforms, the exemplary inventive computer-based devices, and/or the exemplary inventive computer-based components of the present disclosure may be specifically configured to operate in a cloud computing/architecture 625 such as, but not limiting to: infrastructure a service (IaaS) 810, platform as a service (PaaS) 808, and/or software as a service (SaaS) 806 using a web browser, mobile app, thin client, terminal emulator or other endpoint 804. FIGS. 7 and 8 illustrate schematics of exemplary implementations of the cloud computing/architecture(s) in which the exemplary inventive computer-based systems/platforms, the exemplary inventive computer-based devices, and/or the exemplary inventive computer-based components of the present disclosure may be specifically configured to operate.

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

In some embodiments, exemplary inventive, specially programmed computing systems and platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes. In some embodiments, the NFC can represent a short-range wireless communications technology in which NFC-enabled devices are "swiped," "bumped," "tap" or otherwise moved in close proximity to communicate. In some embodiments, the NFC could include a set of short-range wireless technologies, typically requiring a distance of 10 cm or less. In some embodiments, the NFC may operate at 13.56 MHz on ISO/IEC 18000-3 air interface and at rates ranging from 106 kbit/s to 424 kbit/s. In some embodiments, the NFC can involve an initiator and a target; the initiator actively generates an RF field that can power a passive target. In some embodiment, this can enable NFC targets to take very simple form factors such as tags, stickers, key fobs, or cards that do not require batteries. In some embodiments, the NFC's peer-to-peer communication can be conducted when a plurality of NFC-enable devices (e.g., smartphones) within close proximity of each other.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, programs, applications, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, as detailed herein, one or more of the computer-based systems of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a message, a map, an entire application (e.g., a calculator), data points, and other suitable data. In some embodiments, as detailed herein, one or more of the computer-based systems of the present disclosure may be implemented across one or more of various computer platforms such as, but not limited to: (1) Linux, (2) Microsoft Windows, (3) OS X (Mac OS), (4) Solaris, (5) UNIX (6) VMWare, (7) Android, (8) Java Platforms, (9) Open Web Platform, (10) Kubernetes or other suitable computer platforms. In some embodiments, illustrative computer-based systems or platforms of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, illustrative computer-based systems or platforms of the present disclosure may be configured to handle numerous concurrent users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999,999,999,999), and so on.

In some embodiments, illustrative computer-based systems or platforms of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, or objects. For example, such projections may be a visual overlay for a mobile augmented reality (MAR) application.

In some embodiments, illustrative computer-based systems or platforms of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, or any other reasonable mobile electronic device.

As used herein, terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

In some embodiments, the illustrative computer-based systems or platforms of the present disclosure may be configured to securely store and/or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIPEMD-160, RTRO, SHA-1, SHA-2, Tiger (TTH), WHIRLPOOL, RNGs).

The aforementioned examples are, of course, illustrative and not restrictive.

As used herein, the term "user" shall have a meaning of at least one user. In some embodiments, the terms "user", "subscriber" "consumer" or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

At least some aspects of the present disclosure will now be described with reference to the following numbered clauses.

1. A method comprising: receiving, by at least one processor, an activity record history across at least one activity channel of at least one medium of activity; wherein the activity record history is associated with a plurality of entities; receiving, by the at least one processor, a candidate activity channel profile of a future activity channel of a particular entity; wherein the candidate activity channel profile comprises candidate channel attributes comprising: i) a medium attribute identifying the medium associated with the future activity channel, and ii) an activity category attribute identifying a category of activities associated with the future activity channel; utilizing, by the at least one processor, at least one cannibalization forecasting model to predict an at least one channel metric based on the candidate channel attributes; wherein the at least one cannibalization forecasting model comprises model parameters trained based at least in part on the activity record history; wherein the activity record history comprises training labels comprising: i) a date label indicative of a time period relative to an origination date of a particular channel of each activity record in the activity record history, and ii) a medium label indicative of the medium of each activity record in the activity record history; automatically generating, by the at least one processor, new candidate channel attributes that improve the at least one channel metric based on the at least one channel metric; automatically modify, by the at least one processor, a new candidate activity channel profile using the new candidate channel attributes; and causing to display, by the at least one processor, the at least one channel metric on a display of at least one computing device associated with at least one user.

2. The method of clause 1, wherein the at least one channel metric comprises an average order volume associated with transactions: i) online, ii) at the planned retail location, or iii) or both.

3. The method of clause 1, wherein the at least one channel metric comprises an incremental sales volume associated with transactions: i) online, ii) at the planned retail location, or iii) or both.

4. The method of clause 1, wherein the at least one channel metric comprises a total revenue associated with transactions: i) online, ii) at the planned retail location, or iii) or both.

5. The method of clause 1, further comprising determining, by the at least one processor, a cannibalized sales measurement based at least in part on the at least one channel metric; and wherein the at least one channel metric comprises an average order volume and an incremental sales volume associated with transactions: i) online, ii) at the planned retail location, or iii) or both.

6. The method of clause 1, further comprising:
determining, by the at least one processor, a new candidate activity channel profile based on an additional user selection updating one or more candidate channel attributes of the candidate channel attributes; and
utilizing, by the at least one processor, the at least one cannibalization forecasting model to predict an updated channel metric based on the new candidate activity channel profile.

7. The method of clause 1, further comprising utilizing, by the at least one processor, the at least one cannibalization forecasting model to predict a distribution of the at least one channel metric based on the candidate channel attributes and a plurality of variations to the candidate channel attributes.

8. The method of clause 7, further comprising determining, by the at least one processor, optimized candidate channel attributes associated with a minimum cannibalization based on the distribution of the at least one channel metric to produce an optimized candidate activity channel profile.

9. The method of clause 1, further comprising: receiving, by the at least one processor, a plurality of activity records associated with a plurality of entities; wherein each activity record of the plurality of activity records comprise: i) an activity entity identifier associated with an entity of the plurality of entities, ii) a date indicator identifying a date associated with each activity record, iii) an activity location identifier associated with an entity location associated with each activity record, and iv) an activity value; determining, by the at least one processor, first channel activity records of the plurality of activity records based on the activity location identifier of each activity record that identifies a first channel; determining, by the at least one processor, at least one entity associated with the first channel activity records based on the activity entity identifier of each activity record; determining, by the at least one processor, a first channel opening date associated with each first channel based on the date indicator of each retail transaction record; determining, by the at least one processor, the date label for pre-first channel activity records of the plurality of activity records based on: i) the activity location identifier of each activity record associated with the at least one entity that identifies a second channel, and ii) the date indication of each activity record associated with the at least one entity that identifies a pre-first channel opening date occurring before the first channel opening date; determining, by the at least one processor, the date label for post-first channel activity records of the plurality of activity records based on: i) the activity location identifier of each activity record associated with the at least one entity that identifies the second channel, and ii) the date indication of each activity record associated with the at least one entity that identifies a post-first channel opening date occurring on or after the first channel opening date; and training, by the at least one processor, at least one cannibalization forecasting model to forecast the at least one channel metric of future activities upon creating a new channel based on the date label and the location label of each activity record of the plurality of activity records.

10. The method of clause 1, further comprising utilizing, by the at least one processor, the at least one cannibalization forecasting model to predict a distribution of the at least one channel metric over time based on the candidate channel attributes.

11. A method comprising: receiving, by the at least one processor, a plurality of activity records associated with a plurality of entities; wherein each activity record of the plurality of activity records comprise: i) an activity entity identifier associated with an entity of the plurality of entities, ii) a date indicator identifying a date associated with each activity record, iii) an activity location identifier associated with an entity location associated with each activity record, and iv) an activity value; determining, by the at least one processor, first channel activity records of the plurality of activity records based on the activity location identifier of each activity record that identifies a first channel; determining, by the at least one processor, at least one entity associated with the first channel activity records based on the activity entity identifier of each activity record; determining, by the at least one processor, a first channel opening date associated with each first channel based on the date indicator of each retail transaction record; determining, by the at least one processor, the date label for pre-first channel activity records of the plurality of activity records based on: i) the activity location identifier of each activity record associated with the at least one entity that identifies a second channel, and ii) the date indication of each activity record associated with the at least one entity that identifies a pre-first channel opening date occurring before the first channel opening date; determining, by the at least one processor, the date label for post-first channel activity records of the plurality of activity records based on: i) the activity location identifier of each activity record associated with the at least one entity that identifies the second channel, and ii) the date indication of each activity record associated with the at least one entity that identifies a post-first channel opening date occurring on or after the first channel opening date; training, by the at least one processor, at least one cannibalization forecasting model to forecast the at least one channel metric of future activities upon creating a new channel based on the date label and the location label of each activity record of the plurality of activity records; and storing, by the at least one processor, the at least one cannibalization forecasting model for access by at least one user computing device associated with at least one user to forecast the at least one channel metric of the future activities by the new channel based on the activity value and the activity location.

12. The method of clause 11, wherein the at least one channel metric comprises an average order volume associated with transactions: i) online, ii) at the new retail location, or iii) or both.

13. The method of clause 11, wherein the at least one channel metric comprises an incremental sales volume associated with transactions: i) online, ii) at the new retail location, or iii) or both.

14. The method of clause 11, wherein the at least one channel metric comprises a total revenue associated with transactions: i) online, ii) at the new retail location, or iii) or both.

15. The method of clause 11, further comprising: receiving, by at least one processor, an activity record history across at least one activity channel of at least one medium of activity; wherein the activity record history is associated with a plurality of entities; receiving, by the at least one processor, a candidate activity channel profile of a future activity channel of a particular entity; wherein the candidate activity channel profile comprises candidate channel attributes comprising: i) a medium attribute identifying the medium associated with the future activity channel, and ii) an activity category attribute identifying a category of activities associated with the future activity channel; utilizing, by the at least one processor, at least one cannibalization forecasting model to predict an at least one channel metric based on the candidate channel attributes.

16. The method of clause 15, further comprising determining, by the at least one processor, a cannibalized sales measurement based at least in part on the at least one channel metric; and wherein the at least one channel metric comprises an average order volume and an incremental sales volume associated with transactions: i) online, ii) at the planned retail location, or iii) or both.

17. The method of clause 15, further comprising: determining, by the at least one processor, a new candidate activity channel profile based on an additional user selection updating one or more candidate channel attributes of the candidate channel attributes; and utilizing, by the at least one processor, the at least one cannibalization forecasting model to predict an updated channel metric based on the candidate channel attributes.

18. The method of clause 15, further comprising utilizing, by the at least one processor, the at least one cannibalization forecasting model to predict a distribution of the at least one channel metric based on the candidate channel attributes and a plurality of variations to the candidate channel attributes.

19. The method of clause 18, further comprising determining, by the at least one processor, optimized candidate channel attributes associated with a minimum cannibalization based on the distribution of the at least one channel metric to produce an optimized candidate activity channel profile.

20. A system comprising: at least one processor configured to implement software instructions causing the at least one processor to perform steps to: receive an activity record history across at least one activity channel of at least one medium of activity; wherein the activity record history is associated with a plurality of entities; receive a candidate activity channel profile of a future activity channel of a particular entity; wherein the candidate activity channel profile comprises candidate channel attributes comprising: i) a medium attribute identifying the medium associated with the future activity channel, and ii) an activity category attribute identifying a category of activities associated with the future activity channel; utilize at least one cannibalization forecasting model to predict an at least one channel metric based on the candidate channel attributes; wherein the at least one cannibalization forecasting model comprises model parameters trained based at least in part on the activity record history; wherein the activity record history comprises training labels comprising: i) a date label indicative of a time period relative to an origination date of a particular channel of each activity record in the activity record history, and ii) a medium label indicative of the medium of each activity record in the activity record history; automatically generate new candidate channel attributes that improve the at least one channel metric based on the at least one channel metric; automatically modify a new candidate activity channel profile using the new candidate channel attributes; and cause to display the at least one channel metric on a display of at least one computing device associated with at least one user.

Publications cited throughout this document are hereby incorporated by reference in their entirety. While one or more embodiments of the present disclosure have been described, it is understood that these embodiments are illustrative only, and not restrictive, and that many modifications may become apparent to those of ordinary skill in the art, including that various embodiments of the inventive methodologies, the illustrative systems and platforms, and the illustrative devices described herein can be utilized in any combination with each other. Further still, the various steps may be carried out in any desired order (and any desired steps may be added and/or any desired steps may be eliminated).

The invention claimed is:
1. A method comprising:
   receiving, by at least one processor, an activity record history comprising a plurality of activity records across at least one activity channel of at least one medium of activity for at least one entity;
      wherein each activity record of the plurality of activity records comprise activity data comprising:
         i) an activity entity identifier associated with an entity of the plurality of entities,
         ii) a date indicator identifying a date associated with each activity record,
         iii) an activity location identifier associated with an entity location associated with each activity record, and
         iv) an activity value;
   accessing, by the at least one processor, via an external service, enriched entity data associated with the at least one entity;
      wherein the enriched entity data comprises at least one attribute of the at least one entity to add to each activity record;
      wherein the at least one attribute is associated with at least one physical location at which the at least one entity has a presence;
   formatting, by the at least one processor, based on the at least one attribute of the enriched data, the enriched entity data and the plurality of activity records to standardize the enriched entity data and the plurality of activity records into a common format;
   generating, by the at least one processor, a plurality of enriched activity records comprising the plurality of activity records modified with the enriched entity data in the common format;
   determining, by the at least one processor, at least one channel metric associated with the plurality of enriched activity records in a first time period based at least in part on the activity value of each activity record;
   receiving, by the at least one processor from at least one computing device associated with a user, a user selection via a dynamic channel forecasting user interface, the user selection comprising at least one new activity channel attribute associated with a future new activity channel different from the at least one activity channel;
      wherein the dynamic channel forecasting user interface comprises:
         at least one user selectable filter element that enables the user to perform the user selection, and
         at least one dynamic visualization for depicting the at least one channel metric through time;
   inputting, by the at least one processor, the plurality of enriched activity records into at least one cannibalization forecasting model to output a prediction of at least one forecasted activity metric for a second time period after the first time period based on an input of the at least one channel metric and the at least one new activity channel attribute;
      wherein the at least one forecasted activity metric represents at least one predicted channel metric as a function of time for a particular combination of channel attributes;
      wherein the at least one cannibalization forecasting model comprises a plurality of cannibalization forecasting neural network parameters of a cannibalization forecasting neural network;
      wherein the plurality of cannibalization forecasting neural network parameters is configured to output the at least one forecasted activity metric based on an input of the at least one channel metric;
      wherein the plurality of cannibalization forecasting neural network parameters comprise a plurality of node configurations having learned weights trained on historical enriched activity records to correlate an input of the activity data of the plurality of activity records and the at least one attribute of the enriched entity data to an output of the at least one forecasted activity metric for the second time period for the at least one entity;
   causing to display, by the at least one processor on the at least one computing device, at least one update to the at least one dynamic visualization in response to the at least one forecasted activity metric;
      wherein the at least one update depicts at least one change to the at least one channel metric through time based at least in part on the at least one forecasted activity metric associated with the user selection of at least one new activity channel attribute;

receiving, by the at least one processor, at least one subsequent activity record associated with the at least one activity channel of the at least one medium of activity;

accessing, by the at least one processor, via the external service, the enriched entity data associated with the at least one entity;

formatting, by the at least one processor, the enriched entity data and the at least one subsequent activity record to standardize the enriched entity data and the at least one subsequent activity record to the common format;

generating, by the at least one processor, at least one subsequent enriched activity record comprising the at least one subsequent activity record modified with the enriched entity data in the common format;

determining, by the at least one processor, at least one subsequent channel metric associated with the at least one subsequent enriched activity record based at least in part on at least one subsequent activity value of the at least one subsequent activity record; and utilizing, by the at least one processor, an optimizer to re-train the plurality of cannibalization forecasting neural network parameters of the cannibalization forecasting neural network so as to improve a fit of predictions by the cannibalization forecasting neural network, wherein the re-training comprises:

determining an error between the at least one subsequent channel metric and the at least one forecasted activity metric based at least in part on a loss function, and updating the plurality of cannibalization forecasting neural network parameters by backpropagating the error to the plurality of cannibalization forecasting neural network parameters using at least one optimization algorithm so as to update the learned weights of the plurality of node configurations to more accurately correlate an input of the activity data of the plurality of activity records and the at least one attribute of the enriched entity data to an output of the at least one forecasted activity metric for the at least one entity.

2. The method of claim 1, wherein the at least one channel metric comprises an average order volume associated with transactions: i) online, ii) at a planned retail location, or iii) or both.

3. The method of claim 1, wherein the at least one channel metric comprises an incremental sales volume associated with transactions: i) online, ii) at a planned retail location, or iii) or both.

4. The method of claim 1, wherein the at least one channel metric comprises a total revenue associated with transactions: i) online, ii) at a planned retail location, or iii) or both.

5. The method of claim 1, further comprising determining, by the at least one processor, a cannibalized sales measurement based at least in part on the at least one channel metric; and wherein the at least one channel metric comprises an average order volume and an incremental sales volume associated with transactions: i) online, ii) at a planned retail location, or iii) or both.

6. The method of claim 1, further comprising:

determining, by the at least one processor, a new candidate activity channel profile based on an additional user selection updating one or more candidate channel attributes of the candidate channel attributes; and utilizing, by the at least one processor, the at least one cannibalization forecasting model to predict an updated channel metric based on the new candidate activity channel profile.

7. The method of claim 1, further comprising utilizing, by the at least one processor, the at least one cannibalization forecasting model to predict a distribution of the at least one channel metric based on the at least one new activity channel attribute and a plurality of variations to the at least one new activity channel attribute.

8. The method of claim 7, further comprising determining, by the at least one processor, optimized candidate channel attributes associated with a minimum cannibalization based on the distribution of the at least one channel metric to produce an optimized candidate activity channel profile.

9. The method of claim 1, further comprising:

receiving, by the at least one processor, a plurality of activity records associated with a plurality of entities;

wherein each activity record of the plurality of activity records comprise:

i) an activity entity identifier associated with an entity of the plurality of entities, ii) a date indicator identifying a date associated with each activity record, iii) an activity location identifier associated with an entity location associated with each activity record, and iv) an activity value;

determining, by the at least one processor, a first channel activity records of the plurality of activity records based on the activity location identifier of each activity record that identifies a first channel;

determining, by the at least one processor, at least one entity associated with the first channel activity records based on the activity entity identifier of each activity record;

determining, by the at least one processor, a first channel opening date associated with each first channel based on the date indicator of each retail transaction record;

determining, by the at least one processor, a date label for pre-first channel activity records of the plurality of activity records based on:

i) the activity location identifier of each activity record associated with the at least one entity that identifies a second channel, and ii) the date indication of each activity record associated with the at least one entity that identifies a pre-first channel opening date occurring before the first channel opening date;

determining, by the at least one processor, the date label for post-first channel activity records of the plurality of activity records based on:

i) the activity location identifier of each activity record associated with the at least one entity that identifies the second channel, and ii) the date indication of each activity record associated with the at least one entity that identifies a post-first channel opening date occurring on or after the first channel opening date; and training, by the at least one processor, at least one cannibalization forecasting model to forecast at least one channel metric of future activities upon creating a new channel based on the date label and the activity location identifier of each activity record of the plurality of activity records.

10. The method of claim 1, further comprising utilizing, by the at least one processor, the at least one cannibalization forecasting model to predict a distribution of the at least one channel metric over time based on the at least one new activity channel attribute.

11. A method comprising:
receiving, by at least one processor, a plurality of activity records associated with a plurality of entities;
wherein each activity record of the plurality of activity records comprise:
i) an activity entity identifier associated with an entity of the plurality of entities,
ii) a date indicator identifying a date associated with each activity record, iii) an activity location identifier associated with an entity location associated with each activity record, and
iv) an activity value;
accessing, by the at least one processor, via an external service, enriched entity data associated with the at least one entity;
wherein the enriched entity data comprises at least one attribute of the at least one entity to add to each activity record;
wherein the at least one attribute is associated with at least one physical location at which the at least one entity has a presence;
formatting, by the at least one processor, based on the at least one attribute of the enriched data, the enriched entity data and the plurality of activity records to standardize the enriched entity data and the plurality of activity records into a common format;
generating, by the at least one processor, a plurality of enriched activity records comprising the plurality of activity records modified with the enriched entity data in the common format;
determining, by the at least one processor, enriched first channel activity records of the plurality of enriched activity records based on the at least one attribute of the enriched entity data and the activity location identifier of each activity record that identifies a first channel;
determining, by the at least one processor, the at least one entity associated with the enriched first channel activity records based on the activity entity identifier of each enriched activity record;
determining, by the at least one processor, a first channel opening date associated with each first channel based on the date indicator of each enriched activity record;
determining, by the at least one processor, enriched pre-first channel activity records of the plurality of enriched activity records based on:
i) the activity location identifier of each activity record associated with the at least one entity that identifies a second channel,
ii) the date indication of each activity record associated with the at least one entity that identifies a pre-first channel opening date occurring before the first channel opening date, and
iii) the at least one attribute of the enriched entity data;
determining, by the at least one processor, enriched post-first channel activity records of the plurality of enriched activity records based on:
i) the activity location identifier of each activity record associated with the at least one entity that identifies the second channel,
ii) the date indication of each activity record associated with the at least one entity that identifies a post-first channel opening date occurring on or after the first channel opening date, and
iii) the at least one attribute of the enriched entity data;
determining, by the at least one processor, at least one pre-first channel metric through time associated with the enriched pre-first channel activity records of the plurality of enriched activity records based at least in part on the activity value of each enriched pre-first channel activity record of the enriched pre-first channel activity records;
determining, by the at least one processor, at least one post-first channel metric associated with the enriched post-first channel activity records of the plurality of enriched activity records based at least in part on the activity value of each enriched post—first channel activity record of the enriched post-first channel activity records;
determining, by the at least one processor, a combination of channel attributes for the second channel based at least in part on the enriched post-first channel activity records;
utilizing, by the at least one processor, an optimizer to train a plurality of cannibalization forecasting neural network parameters of at least one cannibalization forecasting neural network so as to enable improved predictions of at least one predicted channel metric of future activities upon creating a new channel, wherein the training comprises:
generating a predicted post-first channel activity metric based at least in part on:
the at least one attribute of the at least one entity,
the at least one pre-first channel activity metric, and
the combination of channel attributes for the second channel;
wherein the predicted post-first channel activity metric represents the at least one predicted channel metric as a function of time;
determining, using a loss function, an error between:
the predicted post-first channel activity metric, and
the at least one post-first channel activity metric; and
wherein the plurality of cannibalization forecasting neural network parameters comprise a plurality of node configurations having learned weights to correlate an input of the activity data of the plurality of activity records and the at least one attribute of the enriched entity data to an output of the predicted post-first channel activity metric for the second time period for the at least one entity;
updating, using at least one optimization algorithm, the plurality of cannibalization forecasting neural network parameters of the cannibalization forecasting neural network based at least in part on the error by backpropagating the error to the plurality of cannibalization forecasting neural network parameters so as to train the cannibalization forecasting neural network to forecast the at least one predicted channel metric of the future activities based on the combination of channel attributes so as to update the learned weights of the plurality of node configurations to more accurately correlate an input of the activity data of the plurality of activity records and the at least one attribute of the enriched entity data to an output of the at least one forecasted activity metric for the at least one entity; and
deploying, by the at least one processor, the at least one cannibalization forecasting neural network for access by at least one user computing device associated with at least one user to forecast the at least one channel metric of the future activities by the new channel based on the activity value and the activity location.

12. The method of claim 11, wherein the at least one channel metric comprises an average order volume associated with transactions: i) online, ii) at a new retail location, or iii) or both.

13. The method of claim 11, wherein the at least one channel metric comprises an incremental sales volume associated with transactions: i) online, ii) at a new retail location, or iii) or both.

14. The method of claim 11, wherein the at least one channel metric comprises a total revenue associated with transactions: i) online, ii) at a new retail location, or iii) or both.

15. The method of claim 11, further comprising:
receiving, by at least one processor, an activity record history across at least one activity channel of at least one medium of activity;
  wherein the activity record history is associated with a plurality of entities;
receiving, by the at least one processor, a candidate activity channel profile of a future activity channel of a particular entity;
  wherein the candidate activity channel profile comprises candidate channel attributes comprising:
    i) a medium attribute identifying the medium associated with the future activity channel, and
    ii) an activity category attribute identifying a category of activities associated with the future activity channel;
utilizing, by the at least one processor, at least one cannibalization forecasting model to predict an at least one channel metric based on the candidate channel attributes.

16. The method of claim 15, further comprising determining, by the at least one processor, a cannibalized sales measurement based at least in part on the at least one channel metric; and
  wherein the at least one channel metric comprises an average order volume and an incremental sales volume associated with transactions: i) online, ii) at a planned retail location, or iii) or both.

17. The method of claim 15, further comprising:
determining, by the at least one processor, a new candidate activity channel profile based on an additional user selection updating one or more candidate channel attributes of the candidate channel attributes; and
utilizing, by the at least one processor, the at least one cannibalization forecasting model to predict an updated channel metric based on the candidate channel attributes.

18. The method of claim 15, further comprising utilizing, by the at least one processor, the at least one cannibalization forecasting model to predict a distribution of the at least one channel metric based on the candidate channel attributes and a plurality of variations to the candidate channel attributes.

19. The method of claim 18, further comprising determining, by the at least one processor, optimized candidate channel attributes associated with a minimum cannibalization based on the distribution of the at least one channel metric to produce an optimized candidate activity channel profile.

20. A system comprising:
at least one processor configured to implement software instructions causing the at least one processor to perform steps to:
  receive an activity record history comprising a plurality of activity records across at least one activity channel of at least one medium of activity;
    wherein each activity record of the plurality of activity records comprise:
      i) an activity entity identifier associated with an entity of the plurality of entities,
      ii) a date indicator identifying a date associated with each activity record,
      iii) an activity location identifier associated with an entity location associated with each activity record, and
      iv) an activity value;
  access, via an external service, enriched entity data associated with the at least one entity;
    wherein the enriched entity data comprises at least one attribute of the at least one entity to add to each activity record;
    wherein the at least one attribute is associated with at least one physical location at which the at least one entity has a presence;
  format, based on the at least one attribute of the enriched data, the enriched entity data and the plurality of activity records to standardize the enriched entity data and the plurality of activity records into a common format;
  generate a plurality of enriched activity records comprising the plurality of activity records modified with the enriched entity data in the common format;
  determine at least one channel metric through time associated with the plurality of enriched activity records in a first time period based at least in part on the activity value of each activity record;
  receive, from at least one computing device associated with a user, a user selection via a dynamic channel forecasting user interface, the user selection comprising at least one new activity channel attribute associated with a future new activity channel different form the at least one activity channel;
    wherein the dynamic channel forecasting user interface comprises:
      at least one user selectable filter element that enables the user to perform the user selection, and
      at least one dynamic visualization for depicting the at least one channel metric through time;
  input the plurality of enriched activity records into at least one cannibalization forecasting model to output a prediction of at least one forecasted activity metric for a second time period after the first time period based on an input of the at least one channel metric and the at least one new activity channel attribute;
    wherein the at least one forecasted activity metric represents at least one predicted channel metric as a function of time for a particular combination of channel attributes;
    wherein the at least one cannibalization forecasting model comprises a plurality of cannibalization forecasting neural network parameters of a cannibalization forecasting neural network;
    wherein the plurality of cannibalization forecasting neural network parameters is configured to output the at least one forecasted activity metric based on an input of the at least one channel metric;
    wherein the plurality of cannibalization forecasting neural network parameters comprise a plurality of node configurations having learned weights trained on historical enriched activity records to correlate an input of the activity data of the plurality of activity records and the at least one attribute of the enriched entity data to an output of the at least one forecasted activity metric for the second time period for the at least one entity;

causing to display, one the at least one computing device, at least one update to the at least one dynamic visualization in response to the at least one forecasted activity metric;

wherein the at least one update depicts at least one change to the at least one channel metric through time based at least in part on the at least one forecasted activity metric associated with the user selection of at least one new activity channel attribute;

receive at least one subsequent activity record associated with the at least one activity channel of the at least one medium of activity;

access, via the external service, the enriched entity data associated with the at least one entity;

format the enriched entity data and the at least one subsequent activity record to standardize the enriched entity data and the at least one subsequent activity record to the common format;

generate at least one subsequent enriched activity record comprising the at least one subsequent activity record modified with the enriched entity data in the common format;

determine at least one subsequent channel metric associated with the at least one subsequent enriched activity record based at least in part on at least one subsequent activity value of the at least one subsequent activity record; and utilize an optimizer to re-train the plurality of cannibalization forecasting neural network parameters of the cannibalization forecasting neural network so as to improve a fit of predictions by the cannibalization forecasting neural network, wherein the re-training comprises:

determining an error between the at least one subsequent channel metric and the at least one forecasted activity metric based at least in part on a loss function, and updating the plurality of cannibalization forecasting neural network parameters by backpropagating the error to the plurality of cannibalization forecasting neural network parameters using at least one optimization algorithm so as to update the learned weights of the plurality of node configurations to more accurately correlate an input of the activity data of the plurality of activity records and the at least one attribute of the enriched entity data to an output of the at least one forecasted activity metric for the at least one entity.

* * * * *